US010331416B2

(12) United States Patent
Chaudhry et al.

(10) Patent No.: US 10,331,416 B2
(45) Date of Patent: Jun. 25, 2019

(54) APPLICATION WITH EMBEDDED WORKFLOW DESIGNER

(71) Applicant: Microsoft Technology Licensing, LLC, Redmond, WA (US)

(72) Inventors: Anjli Chaudhry, Seattle, WA (US); Stephen Siciliano, Bellevue, WA (US); Ashwin Sathya Raghunathan, Bellevue, WA (US); Kartik Rao Polepalli, Redmond, WA (US); Merwan Vishnu Hade, Seattle, WA (US); Prabir K. Shrestha, Redmond, WA (US); Sunay Vaishnav, Bellevue, WA (US); Charles Lamanna, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/408,238

(22) Filed: Jan. 17, 2017

(65) Prior Publication Data
US 2017/0315782 A1 Nov. 2, 2017

Related U.S. Application Data

(60) Provisional application No. 62/328,913, filed on Apr. 28, 2016, provisional application No. 62/329,016, filed on Apr. 28, 2016.

(51) Int. Cl.
*G06F 8/20* (2018.01)
*G06F 8/34* (2018.01)
(Continued)

(52) U.S. Cl.
CPC .................. *G06F 8/20* (2013.01); *G06F 8/34* (2013.01); *G06F 8/36* (2013.01); *G06F 9/4881* (2013.01);
(Continued)

(58) Field of Classification Search
None
See application file for complete search history.

(56) References Cited

U.S. PATENT DOCUMENTS 6,603,882 B2    8/2003  Oh et al.
6,728,762 B1 *  4/2004  Estrada ............. G06F 17/30873
                                              707/999.01
(Continued)

FOREIGN PATENT DOCUMENTS

CN    102999816 A    3/2013
CN    104850405 A    8/2015
(Continued)

OTHER PUBLICATIONS

Cappiello, et al., "Enabling End User Development through Mashups: Requirements, Abstractions and Innovation Toolkits", In the proceedings of Third International Symposium on End User Development, Part of the Lecture Notes in Computer Science Book Series, vol. 6654, Jun. 7, 2011, pp. 9-24.
(Continued)

*Primary Examiner* — Philip Wang
(74) *Attorney, Agent, or Firm* — Fiala & Weaver P.L.L.C.

(57) ABSTRACT

A workflow development system is described herein that embeds a workflow designer user interface of a workflow development application into a user interface of another software application, so that the workflow designer user interface can be used to generate workflows that reference and/or interact with the other software application. In some aspects, the workflow development application obtains information indicative of a context of a user within the other software application and recommends workflow templates or workflow steps for selection by a user based on the obtained information. The workflow development applica-
(Continued)

tion may also pre-populate certain parameters of certain workflow steps based on the obtained information.

20 Claims, 13 Drawing Sheets

(51) Int. Cl.
| | |
|---|---|
| *G06F 8/36* | (2018.01) |
| *G06F 9/48* | (2006.01) |
| *G06Q 10/06* | (2012.01) |
| *G06F 17/22* | (2006.01) |
| *G06F 17/24* | (2006.01) |
| *G06Q 10/10* | (2012.01) |
| *G06F 3/0482* | (2013.01) |

(52) U.S. Cl.
CPC ........ *G06F 17/2205* (2013.01); *G06F 17/248* (2013.01); *G06Q 10/067* (2013.01); *G06Q 10/0633* (2013.01); *G06Q 10/06316* (2013.01); *G06Q 10/10* (2013.01); *G06F 3/0482* (2013.01)

(56) References Cited

U.S. PATENT DOCUMENTS

| | | | |
|---|---|---|---|
| 7,065,493 B1* | 6/2006 | Homsi | G06Q 10/06 705/7.26 |
| 7,069,536 B2 | 6/2006 | Yaung | |
| 7,272,616 B1 | 9/2007 | McKinnon | |
| 7,428,495 B2* | 9/2008 | Dhar | A61J 9/00 705/7.26 |
| 7,571,069 B1* | 8/2009 | Farkas | G06Q 10/06 702/119 |
| 7,840,934 B2 | 11/2010 | Sayal et al. | |
| 7,991,317 B2 | 8/2011 | Kato et al. | |
| 8,117,549 B2 | 2/2012 | Reiner | |
| 8,195,321 B2 | 6/2012 | Mackelprang et al. | |
| 8,301,480 B2 | 10/2012 | Ramachandran | |
| 8,392,875 B2 | 3/2013 | Fish et al. | |
| 8,583,466 B2 | 11/2013 | Margulies et al. | |
| 8,781,998 B2 | 7/2014 | Jafri et al. | |
| 9,043,870 B1 | 5/2015 | Barenholz et al. | |
| 9,152,402 B2 | 10/2015 | Scheidel et al. | |
| 9,424,112 B1* | 8/2016 | Malamut | G06F 9/547 |
| 2002/0152254 A1 | 10/2002 | Teng | |
| 2003/0195762 A1 | 10/2003 | Gleason et al. | |
| 2004/0133876 A1 | 7/2004 | Sproule | |
| 2006/0069605 A1 | 3/2006 | Hatoun | |
| 2006/0136490 A1 | 6/2006 | Aggarwal et al. | |
| 2007/0038499 A1 | 2/2007 | Margulies et al. | |
| 2007/0106633 A1 | 5/2007 | Reiner | |
| 2007/0236708 A1 | 10/2007 | Jahn et al. | |
| 2009/0171708 A1 | 7/2009 | Bobak et al. | |
| 2009/0183185 A1 | 7/2009 | Srour et al. | |
| 2010/0049740 A1* | 2/2010 | Iwase | G06F 19/321 705/7.27 |
| 2010/0050183 A1 | 2/2010 | Ogura | |
| 2010/0070945 A1* | 3/2010 | Tattrie | G06F 8/20 717/101 |
| 2010/0106282 A1 | 4/2010 | Mackelprang et al. | |
| 2010/0241990 A1 | 9/2010 | Gabriel et al. | |
| 2012/0227044 A1* | 9/2012 | Arumugham | G06Q 10/06 718/100 |
| 2013/0007244 A1 | 1/2013 | Gnech et al. | |
| 2013/0152038 A1 | 6/2013 | Lim et al. | |
| 2014/0075413 A1 | 3/2014 | Binjrajka | |
| 2014/0282367 A1 | 9/2014 | Harrill et al. | |
| 2014/0310052 A1 | 10/2014 | Foehr et al. | |
| 2014/0324501 A1 | 10/2014 | Davidow et al. | |
| 2015/0046915 A1* | 2/2015 | Oliver | G06F 8/65 717/170 |
| 2015/0160809 A1 | 6/2015 | Mikheev | |
| 2015/0347935 A1 | 12/2015 | Standing et al. | |
| 2017/0315981 A1 | 11/2017 | Shrestha et al. | |
| 2017/0316355 A1 | 11/2017 | Shrestha et al. | |
| 2017/0316363 A1* | 11/2017 | Siciliano | G06Q 10/06316 |

FOREIGN PATENT DOCUMENTS

| | | |
|---|---|---|
| WO | 2012075622 A1 | 6/2012 |
| WO | 2015077896 A1 | 6/2015 |

OTHER PUBLICATIONS

"International Search Report and Written Opinion Issued in PCT Application No. PCT/US2017/029502", dated Aug. 7, 2017, 13 Pages.
Siciliano, Stephen, "Welcome to Microsoft Flow: Flow Blog", Retrieved from: <<https://flow.microsoft.com/en-us/blog/welcome-to-microsoft-flow/>>, Apr. 27, 2016, 6 Pages.
"WorkfloPlus User Guid", Published on: Dec. 24, 2015 Available at: http://maintenancepro.blob.core.windows.net/downloads/v1.1/WorkfloPlus%20User%20Guide.pdf.
Soneff, Steven, "One tap sign-up and automatic sign-in without password entry using Smart Lock", Published on: Dec. 11, 2015 Available at: http://android-developers.blogspot.in/2015/12/one-tap-sign-up-and-automatic-sign-in.html.
"Workflow Management Software—Comindware Tracker", Retrieved on: May 2, 2016 Available at: https://www.comindware.com/workflow-management-software/?utm_expid=42389666-33.E-91Wa0BR4CfDMo1dNWdRQ.0&utm_referrer=https%3A%2F%2Fwww.google.co.in%2F.
Smalser, Aaron, "What is application access and single sign-on with Azure Active Directory?", Retrieved on: May 2, 2016 Available at: https://azure.microsoft.com/en-in/documentation/articles/active-directory-appssoaccess-whatis/.
Brown, James, "How to Create a Workflow in VMware vRealize Orchestrator", Published on: Feb. 11, 2015 Available at: https://virtualizationreview.com/articles/2015/02/11/how-to-create-a-workflow-in-vrealize-orchestrator.aspx.
"Nintex", Published on: Sep. 18, 2015 Available at: http://www.nintex.com/workflow-plafform/nintex-mobile#Collections-of-Forms-and-Workflow-Tasks.
"IF by IFTIT", Retrieved From: https://web.archive.org/web/20160602125112/https://play.google.com/store/apps/details?id=com.ifttt.ifttt, Retrieved on: May 6, 2016, 3 Pages.
"Zapier", Retrieved From: https://zapier.com/developer/documentation/v2/#what-is-zapier, Apr. 1, 2016, 4 Pages.
Gonzalez, et al., "Automating the Implementation of Analysis Concerns in Workflow Applications", In International Conference on Automated Software Engineering, Nov. 16, 2009, pp. 585-589.
"International Search Report and Written Opinion Issued in PCT Application No. PCT/US2017/029498", dated Jun. 13, 2017, 13 Pages.
"International Search Report and Written Opinion Issued in PCT Application No. PCT/US2017/029500", dated Jun. 13, 2017, 12 Pages.
"Non Final Office Action Issued in U.S. Appl. No. 15/417,845", dated Sep. 27, 2018, 22 Pages.

* cited by examiner http://contost.sharepoint.com/teams/marketing

⊕ Create new  ☐ Edit  ☐ Add Flow —— 1304

ASSETS

| Title | Name | Year | Assigned To | Asset Type | Price |
|---|---|---|---|---|---|
| Lenovo ThinkPad | Lenovo ThinkPad X1 | 2/1/2016 | Jane Smith | Laptop PC | $1000.00 |
| Surface Pro 2 | Surface Pro 2 | 2/1/2016 | Oliver Box | Convertible | $2000.00 |
| MacBook Pro | MacBook Pro 232 | 2/2/2014 | Harris Johnson | Laptop | $3000.00 |
| iPad 2 | Apple iPad Air 2 | 1/1/2013 | Anne Paul | Tablet | $1200.00 |
| Apple iPad Mini | Apple iPad Mini 2 | 1/1/2014 | Bella Thomson | Tablet | $700.00 |
| Amazon Fire TV | Amazon Fire 4 | 4/4/2015 | Andrew Tim | Tablet | $100.00 |
| Apple iPhone 4 | Apple iPhone 4 | 5/2/2012 | Tammy Pane | Phone | $500.00 |

FIG. 13

Marketing

+ Create new  ☑ Edit  ☐ Add Flow —— 1304

ASSETS

| Title | Name | Year | | Create New Flow |
|---|---|---|---|---|
| Lenovo ThinkPad | Lenovo ThinkPad X1 | 2/1/2016 | As... Ja... | When a new item is added in SharePoint, send email — 1402 |
| Surface Pro 2 | Surface Pro 2 | 2/1/2016 | Ol... | When an object is created in Salesforce, create an item in SharePoint — 1404 |
| MacBook Pro | MacBook Pro 232 | 2/2/2014 | Ha... | |
| iPad 2 | Apple iPad Air 2 | 1/1/2013 | An... | When a new item is added in SharePoint, insert a row in SQL — 1406 |
| Apple iPad Mini | Apple iPad Mini 2 | 1/1/2014 | Be... | |
| Amazon Fire TV | Amazon Fire 4 | 4/4/2015 | An... | When a new item is added in SharePoint, complete a custom action — 1408 |
| Apple iPhone 4 | Apple iPhone 4 | 5/2/2012 | Ta... | |

FIG. 14

APPLICATION WITH EMBEDDED WORKFLOW DESIGNER

CROSS-REFERENCE TO RELATED APPLICATIONS

This application claims the benefit of U.S. Provisional Patent Application No. 62/328,913, filed on Apr. 28, 2016, and U.S. Provisional Patent Application No. 62/329,016, filed Apr. 28, 2016, each of which is incorporated by reference herein in its entirety.

BACKGROUND

A business or enterprise application is a computer program used by business users to perform various business functions. Business applications are frequently developed when available off-the-shelf software does not completely address the desired functionality. Many business applications are interactive, having a graphical user interface (GUI) via which users can input data, submit data queries, perform operations, and view results. Consumer applications are less business focused, instead being focused on the needs of the consumer.

Business and consumer users tend to depend on information technology (IT) personnel to code their applications due to application complexity, and the programming expertise required. For example, merely designing an application to retrieve data from a remote source (e.g., a cloud service) is difficult, typically requiring the involvement of an experienced software developer.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A workflow development system is described herein that is configured to embed a workflow designer user interface of a workflow development application into a user interface of another software application from which the workflow development application was invoked. In some aspects, the workflow development application obtains information indicative of a context of a user within the other software application and recommends workflow templates or workflow steps for selection by a user based on the obtained information. The workflow development application may also pre-populate certain parameters of certain workflow steps based on the obtained information.

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 13 shows an example view of a software application GUI, according to an example embodiment.

FIG. 14 shows an example view of a software application GUI in which a workflow designer GUI has been embedded, according to an example embodiment.

Figure 1:
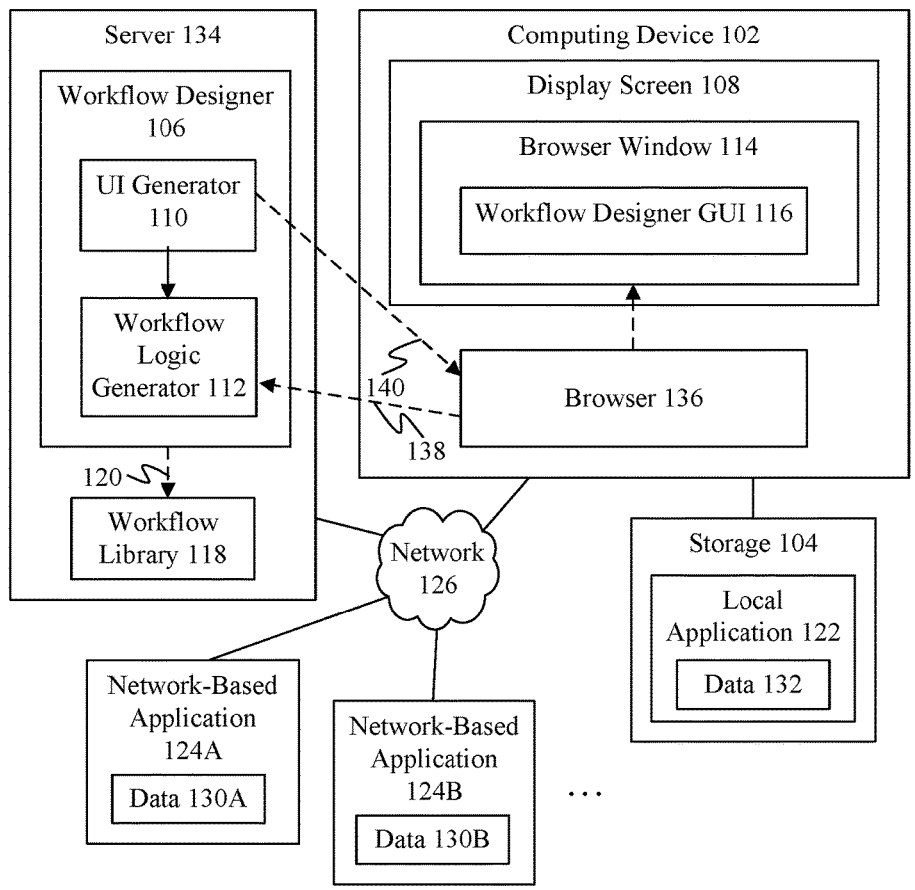
FIG. 1 is a block diagram of a workflow development system, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below will describe example embodiments for development of workflows. In particular, sub-sections A and B of Section II describe example workflow development embodiments and runtime embodiments, respectively. Subsection C of Section II describes example embodiments in which a workflow designer of a workflow development application may be embedded within a user interface of another software application.

Section III below will describe an example mobile device that may be used to implement features of the embodiments described herein. Section IV below will describe an example processor-based computer system that may be used to implement features of the embodiments described herein. Section V below will describe some additional example embodiments. Section VI will provide some concluding remarks.

II. Example Embodiments for Development of Workflows

Business applications and consumer applications are typically created when available off-the-shelf software does not completely address the desired functionality. Many business and consumer applications are interactive, having a GUI via which users can input data, submit data queries, perform operations, and view results.

Users tend to depend on IT personnel to code their applications due to application complexity and the programming expertise required. For instance, configuring an application to retrieve data from a source of interest to enterprises or consumers (e.g., data from an SQL (structured query language) database, customer relationship information from Salesforce.com of San Francisco, Calif., social network information from Facebook® operated by Facebook, Inc. of Palo Alto, Calif., or Twitter® operated by Twitter, Inc. of San Francisco, Calif.) is a difficult process.

Embodiments described herein enable easier development of applications, including business applications and consumer applications. The technical effect of the embodiments described herein enable users to develop applications in the form of workflows without having to be expert programmers.

Example embodiments are described in the following subsections for development of applications in the form of workflows. In the following description, a person that develops an application using the techniques described herein may be referred to as a "developer" and a person that uses the application at runtime may be referred to as a "user" or "end user". However, it is to be understood that the developer may also be considered a "user" of the workflow development system. Furthermore, a "developer," as referred to herein, does not need to have any expertise in computer programming. Various embodiments described herein enable application development without special programming skills.

A. Example Workflow Development Embodiments

Development of workflows may be enabled in various ways in embodiments. For instance, FIG. 1 is a block diagram of a workflow development system 100, according to an example embodiment. As shown in FIG. 1, system 100 includes a computing device 102, storage 104, a first network-based application 124A, a second network-based application 124B, and a server 134. Server 134 includes a workflow designer 106 and a workflow library 118 (e.g., in storage). Computing device 102 includes a display screen 108 and a browser 136. Storage 104 stores a local application 122. System 100 is described as follows.

Computing device 102 may be any type computing device, including a mobile computing device (e.g., a smart phone, a Microsoft® Surface® device, a laptop computer, a notebook computer, a tablet computer such as an Apple iPad™, a netbook, etc.), a wearable computing device (e.g., a head-mounted device including smart glasses such as Google Glass™, etc.), or a stationary computing device such as a desktop computer or PC (personal computer). Server 134 may include one or more server devices and/or other computing devices.

Local application 122 in storage 104 is an example of an application accessible by computing device 102 without communicating over a network. Local application 122 may be configured to perform data processing and/or data hosting operations when executed by a processor of computing device 102, and may provide data 132 to workflows developed using workflow designer 106 when such workflows are executed at runtime. Local application 122 may be any type of local application or service, such as a database application (e.g., QuickBooks®, a Microsoft® Excel® spreadsheet), an e-mail application (e.g., Microsoft® Outlook®), a productivity application (e.g., Microsoft® Word®, Microsoft® PowerPoint®, etc.), or another type of application. Although FIG. 1 shows a single local application, any number of local applications may be present at computing device 102, including numbers in the tens, hundreds, or greater numbers.

First and second network-based applications 124A and 124B are examples of network-based applications, which in some instances may be referred to as "cloud" applications or services. Network-based applications 124A and 124B are accessible by computing device 102 over network 126, may be configured to perform data processing and/or data hosting operations, and may provide data 130A and 130B, respectively, to workflows created using workflow designer 106 when such workflows are executed at runtime. Network-based applications 124A and 124B may each be any type of network-accessible applications or services, such as database applications, social networking applications, messaging applications, financial services applications, news applications, search applications, productivity applications, cloud storage applications, file hosting applications, etc. Examples of such applications include a network-accessible SQL (structured query language) database, Salesforce.com™, Facebook®, Twitter®, Instagram®, Yammer®, LinkedIn®, Yahoo!® Finance, The New York Times® (at www.nytimes.com), Google™ search, Microsoft® Bing®, Google Docs™, Microsoft® Office 365®, Dropbox®, etc. Although FIG. 1 shows two network-based applications, any number of network-based applications may be accessible over network 126, including numbers in the tens, hundreds, thousands, or greater numbers.

Note that data 130A, data 130B, and data 132 may each include any type of data, including messages, notifications, calculated data, retrieved data, structured data, unstructured data, and/or any other type of information requested or usable by a workflow.

Computing device 102 and server 134 may each include at least one wired or wireless network interface that enables communications with each other and with network-based applications 124A and 124B over network 126. Examples of such a network interface include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein. Examples of network 126 include a local area network (LAN), a wide area network (WAN) such as the Internet, a personal area network (PAN), and/or a combination of communication networks.

Workflow designer 106 is configured to be operated/interacted with to create applications in the form of workflows. For instance, a developer may access workflow designer 106 by interacting with an application at computing device 102 that is capable of accessing a network-based application, such as by interacting with browser 136. The developer may use browser 136 to traverse a network address (e.g., a uniform resource locator) to workflow designer 106, which invokes a workflow designer GUI 116 (e.g., a web page) in a browser window 114. The developer is enabled to interact with workflow designer GUI 116 to develop a workflow.

As shown in FIG. 1, workflow designer 106 includes a UI generator 110 and a workflow logic generator 112. UI generator 110 is configured to transmit workflow GUI information 140 (e.g., one or more web pages, image content, etc.) to browser 136 to be displayed as workflow designer GUI 116 within browser window 114 in display screen 108. Workflow designer GUI 116 may be interacted with by a developer to select and configure workflow steps into a workflow. For example, the developer may insert and sequence a plurality of workflow steps in workflow designer GUI 116, with one or more of the steps being associated with a local or network-based application. Browser 136 stores the selected workflow steps, corresponding configuration information, and workflow step sequence information as constructed workflow information 138. Constructed workflow information 138 is transmitted to workflow logic generator 112 at server 134. Workflow logic generator 112 generates workflow logic 120 based on the assembled workflow represented by constructed workflow information 138. The workflow represented by workflow logic 120 may subsequently be invoked for execution by an end user.

During runtime execution of the workflow, workflow logic 120 may invoke operation of one or more local or network-based applications associated with the workflow steps of workflow logic 120. Each workflow step may receive input data. Such input data may include, for example, data 132 from local application 122, data 130A from network-based application 124A, data 130B from network-based application 124B, data from another application, and/or data from another workflow step of workflow logic 120.

Figure 3:
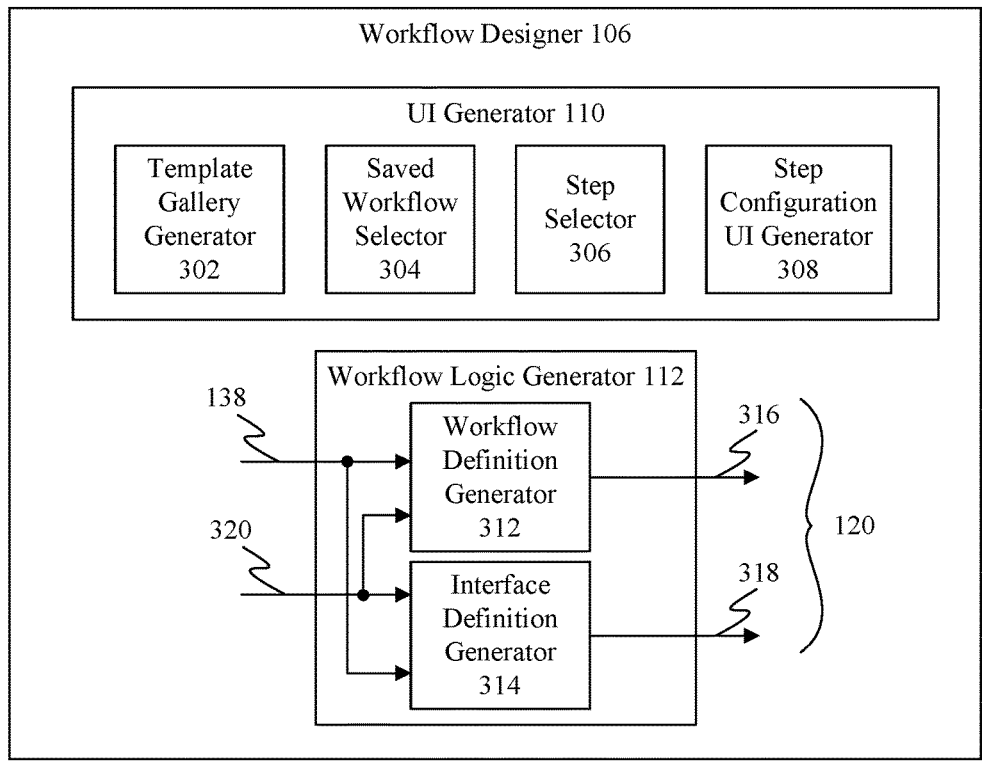
FIG. 3 is a block diagram of a workflow designer, according to an example embodiment.
Figure 4:
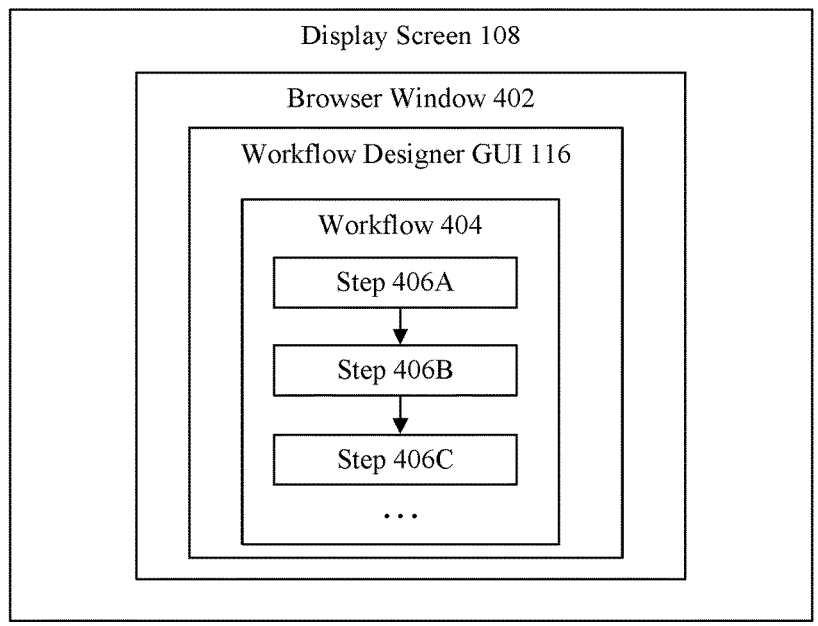
FIG. 4 is a block diagram of a display screen showing a browser window displaying an exemplary workflow, according to an example embodiment.

Workflow designer 106 may operate in various ways, to enable development of a workflow. For instance, in embodiments, workflow designer 106 may operate in accordance with flowchart 200 of FIG. 2. In particular, flowchart 200 depicts a process for development of workflows, according to an example embodiment. Flowchart 200 and workflow designer 106 are described as follows with respect to FIGS. 3 and 4. FIG. 3 is a block diagram of workflow designer 106, according to an example embodiment. As shown in FIG. 3, workflow designer 106 includes UI generator 110 and workflow logic generator 112. UI generator 110 includes a template gallery generator 302, a saved workflow selector 304, a step selector 306, and a step configuration UI generator 308. Workflow logic generator 112 includes a workflow definition generator 312 and an interface definition generator 314. FIG. 4 is a block diagram of display screen 108, illustrating an example of workflow designer GUI 116 displayed in browser window 402 on display screen 108, according to an example embodiment.

Figure 2:
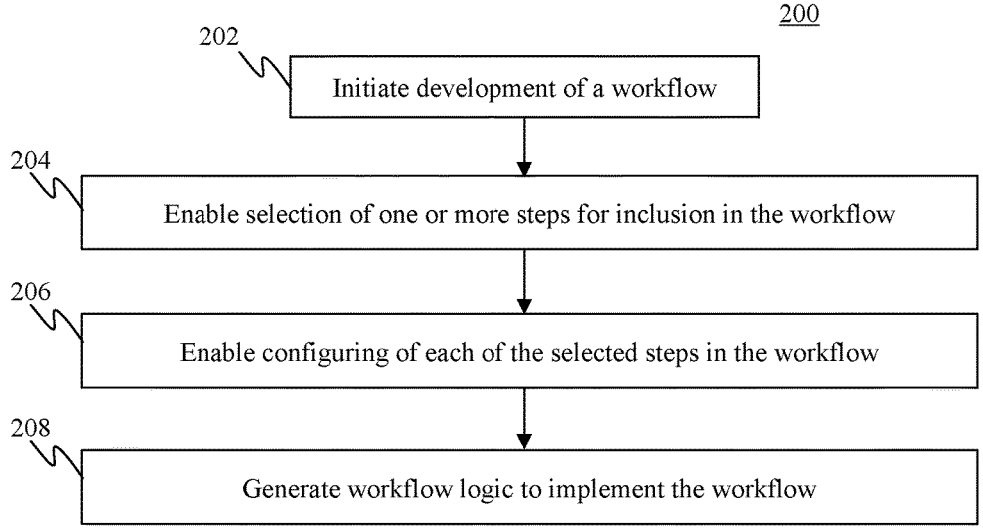
FIG. 2 depicts a flowchart of a process for development of workflows, according to an example embodiment.

Flowchart 200 of FIG. 2 begins with step 202. In step 202, development of a workflow is initiated. For example, in an embodiment, workflow designer 106 may be invoked by a developer interacting with browser 136 at computing device 102. The developer may traverse a link or other network address directed to workflow designer 106 at server 134, to invoke workflow designer 106, causing workflow designer 106 to provide workflow GUI information 140 (e.g., one or more web pages, image content, etc.) to browser 136 to be displayed as workflow designer GUI 116 in display screen 108 in browser window 114. Once invoked, the developer may open an existing workflow for further development, or may begin developing a new workflow.

In one example, a displayed page of workflow designer GUI 116 may display a template gallery generated by template gallery generator 302. The template gallery may include a plurality of selectable workflow templates, each of which includes one or more pre-selected workflow steps that are suitable for further configuration by a developer. The workflow templates may be stored in workflow library 118, and accessed for display by workflow designer GUI 116. The developer may select one of the workflow templates for inclusion in her workflow, and may proceed with configuring the contents of the workflow template, and/or may add additional workflow steps to the workflow steps of the workflow template to generate a more complex workflow.

For instance, in the example of FIG. 4, steps 406A and 406B may have been included in a workflow template placed in workflow 404, and step 406C may have been subsequently added (e.g., via selection from a menu or other list of workflow steps).

In another example, saved workflow selector 304 may enable the developer to select an existing, saved workflow to be opened for further editing in a displayed page of workflow designer GUI 116. The saved workflows may be stored in workflow library 118 or elsewhere. For example, saved workflow selector 304 may display a list of saved workflows, may enable navigation to a saved workflow, and/or may provide another mechanism for selecting a saved workflow for editing. The developer may then proceed with further configuring the contents of the workflow, adding workflow steps, modifying workflow steps, removing workflow steps, or the like.

In yet another example, a displayed page of workflow designer GUI 116 may provide a blank window, area, or canvas to which one or more developer-selected workflow steps may be added, ordered and configured. Such blank window, area, or canvas may be generated by UI generator 110 automatically or in response to some developer input or interaction.

In step 204, selection of one or more steps for inclusion in the workflow is enabled. When a developer is editing a workflow, step selector 306 may enable the developer to select workflow steps for inclusion in the workflow, and to order the steps. The workflow steps may be accessed by step selector 306 in workflow library 118. For instance, step selector 306 may display a menu of workflow steps, a scrollable and/or searchable list of available workflow steps, or may provide the workflow steps in another manner, and may enable the developer to select any number of workflow steps from the list for inclusion in the workflow.

In one example, step selector 306 may enable a developer to select a step that is associated with a local application, such as Microsoft® Outlook®, or a network-based application, such as Facebook®. Step selector 306 enables the steps to be chained together in a sequence, optionally with conditional steps, for inclusion in workflow logic 120.

In step 206, each of the selected steps in the workflow is enabled to be configured. In an embodiment, step configuration UI generator 308 enables configuration of each workflow step in a workflow. Step configuration UI generator 308 accesses each selected workflow step in workflow library 118 to determine the configuration of the workflow step, including all of its input parameters and any other selections or information that a developer needs to provide to the workflow step to configure it. For example, step configuration UI generator 308 may generate a UI that enables the developer to type, navigate to, use a pull-down menu, or otherwise enter input data into a text input box or other data entry element to configure (e.g., specify an input parameter of) a workflow step. The developer may configure an output parameter of a prior step to be input data for a workflow step. Step configuration UI generator 308 may enable data or other objects to be copied and pasted, dragged and dropped, or otherwise entered from elsewhere into data entry elements of a workflow step.

In step 208, workflow logic to implement the workflow is generated. In an embodiment, workflow logic generator 112 is configured to package and generate workflow logic 120 based on constructed workflow information 138 when the developer indicates the workflow is finished, such as when the developer interacts with workflow designer GUI 116 to save the workflow. As shown in FIG. 3, workflow logic generator 112 receives constructed workflow information 138. Constructed workflow information 138 indicates which workflow steps have been inserted into the workflow, their input parameter values, and their sequencing. Workflow logic generator 112 also receives selected workflow logic 320, which is the workflow logic for each workflow step of the workflow as indicated in constructed workflow information 138. In one example, workflow logic generator 112 retrieves workflow logic from workflow library 118 for each workflow step indicated in constructed workflow information 138, to receive selected workflow logic 320. Workflow logic generator 112 generates workflow logic 120 for the workflow based on constructed workflow information 138 and selected workflow logic 320. For example, workflow logic generator 112 may generate workflow logic 120 in the form of an executable file, a zip file, or other form, which may be executed in a standalone fashion, may be executed in a browser, or may be executed in another manner, depending on the particular type of workflow being generated.

With reference to FIG. 3, workflow logic generator 112 may generate workflow logic 120 to include at least two components (e.g., files): workflow definition information 316 and interface definition information 318. Workflow definition information 316 includes information that defines the sequence and operation of the workflow of workflow logic (e.g., lists the workflow step operations and their ordering/sequencing) and includes the parameter values for the workflow. For example, workflow definition information 316 may be generated to contain information in the format of a JSON (JavaScript object notation) file or in another form. Interface definition information 318 includes information that defines the interfaces/parameters (e.g., inputs and outputs) of the workflow steps of the workflow. For example, interface definition information 318 may be generated to contain information in the format of a Swagger (a specification for REST (representational state transfer) web services) file or in another form. For instance, each workflow step may be represented in workflow library 118 as API (application programming interface) metadata in Swagger format, defining what are the inputs and outputs (parameters) of the workflow step, such that a service may be accessed according to the API definition. In such an implementation, the operations in the workflow definition information 316 refer to the corresponding API metadata in the interface definition information 318 to provide a complete structure of a generated workflow (e.g., each sequenced workflow step/operation defined with parameter values in the workflow definition information 316 has a corresponding API, which is defined in the interface definition information 318).

Accordingly, flowchart 200 and workflow designer 106 enable a developer to create workflows. FIGS. 5-8 show views of an exemplary workflow in various phases of development using a workflow designer GUI, according to example embodiments. For example, each of FIGS. 5-8 shows browser window 402 displaying a corresponding view of workflow designer GUI 116 being used to develop a workflow.

Figure 5:
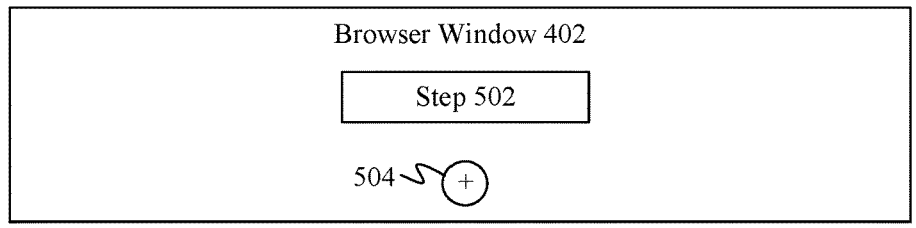
FIGS. 5-8 show views of an exemplary workflow in various phases of development using a workflow designer GUI, according to example embodiments.

For instance, FIG. 5 shows browser window 402 including a workflow step 502 and an add interface 504. Workflow step 502 was selected by a developer to be a first step in a workflow. Add interface 504 (e.g., a button or other GUI control) may be interacted with by the developer to add further workflow steps to the workflow.

As described above, a developer is enabled to select workflow step 502 from a list or library of workflow steps, a template gallery, or elsewhere. A list, library, or gallery may include any number of workflow steps. The workflow steps may be associated with network-based applications mentioned elsewhere herein or otherwise known (e.g., Dropbox®), and/or with local applications mentioned elsewhere herein or otherwise known (e.g., Microsoft® Outlook®). Each workflow step is configured to be plugged into the workflow. Each workflow step is configured with the appropriate logic and/or interface(s) to perform its respective function(s), which may include communicating with a local or remote application. For instance, a workflow step for transmitting a query to an application (e.g., a search query to a search engine, a database query to a database, a request for data from a social networking application, etc.) may be pre-configured in terms of how to properly transmit and format such a request to the application. As another example, a workflow step for receiving a response to a request may be pre-configured in terms of how to parse the response for desired response data. As such, a developer of a workflow does not need to know how to write program code in a programming language, to interface with complex application interfaces (e.g., application programming interfaces (APIs)), or to understand network communication protocols, as the workflow steps are already set up. When a workflow step is plugged into workflow logic by a developer, the developer configures the inputs to the workflow step (as described below), and the pre-configured workflow step handles any communications with other applications.

Figure 6:
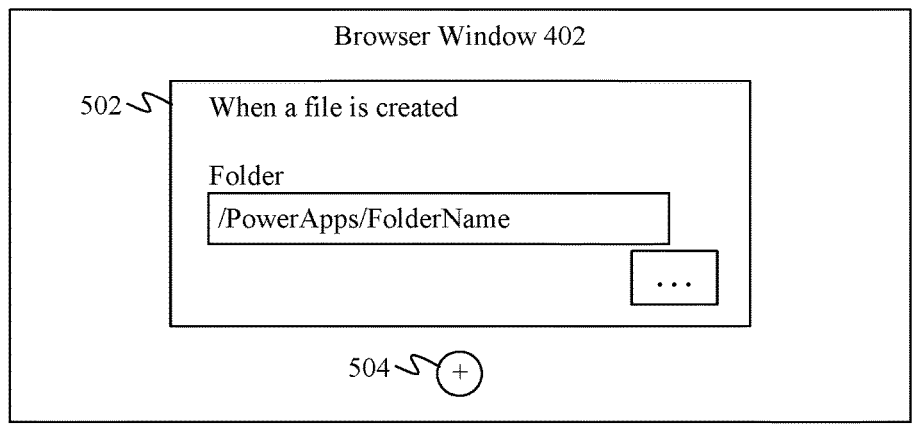

In FIG. 6, the developer has interacted with step 502 (e.g., by mouse click, etc.) to cause step configuration UI generator 310 to generate a UI for configuration of step 502. For instance, in the example of FIG. 6, workflow step 502 is configured to perform monitoring to determine if a file has been created in a particular folder identified by the developer in a text input box (e.g., by typing, clicking on a navigator indicated by " . . . ", etc.). When workflow step 502 determines that a file has been added to the indicated folder, a workflow step following workflow step 502 is triggered. Thus, workflow step 502 may be considered a trigger step in this example.

Figure 7:
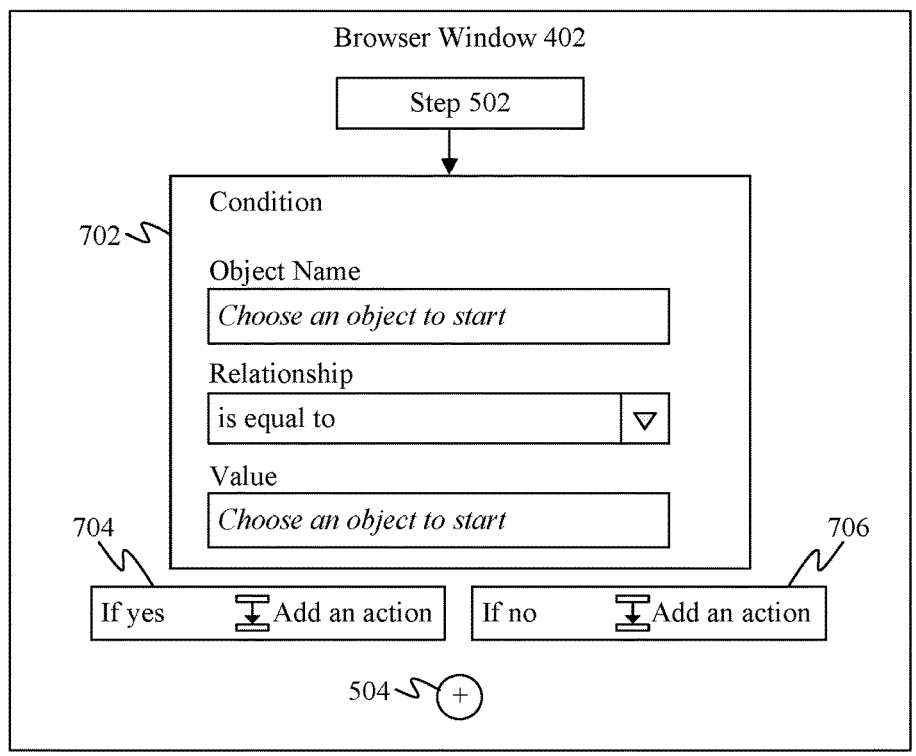

For instance, in FIG. 7, the developer interacted with add interface 504 to facilitate the selection of a next workflow step 702. For instance, in an embodiment, interaction with add interface 502 invokes step selector 306 in FIG. 3, which enables the developer to select a workflow step. In the example of FIG. 7, workflow step 702 is a conditional step. In embodiments, logical elements may be selected for inclusion in a workflow, including arithmetic logic (e.g., summers, multipliers, etc.), conditional logic, etc., that operate based on variable values determined in earlier workflow steps. The condition of workflow step 702 enables the workflow to fork based on the determination of a condition (e.g., a variable value). The condition may include an object name, a relationship (e.g., a logical relationship, such as equal to, includes, not equal to, less than, greater than, etc.), and a value, which are all defined by the developer interacting with workflow step 702. Corresponding action steps may be performed depending on which way the workflow forks based on the condition.

For instance, in one illustrative example of FIG. 7, the object name may be selected (e.g., from a list of possibilities) to be a name of the created file of workflow step 502, the relationship may be "contains" (e.g., selected by a pull-down menu) and the value may be "dummyfile" (e.g., typed in by the developer). The condition evaluates to a "yes" condition if the file name contains "dummyfile," which invokes first action workflow step 704, and evaluates to "no" condition if the file name does not contain "dummyfile," which invokes second action workflow step 706. An action may be defined for one or both of the "yes" and "no" action workflow steps 704 and 706 by the developer, if desired.

Figure 8:
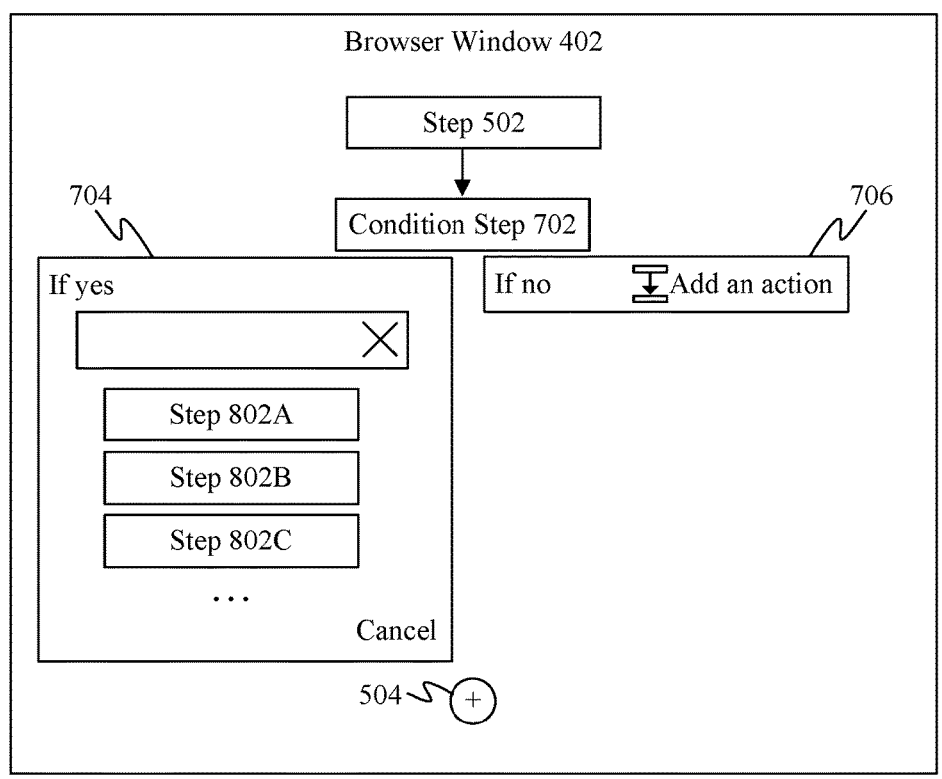

For example, in FIG. 8, the developer interacts with action workflow step 704 to define an action. In this example, the developer is defining action workflow step 704 by selecting a workflow step via step selector 306. As shown in FIG. 8, a list of workflow steps 802A, 802B, 802C is displayed, from which the developer can select a workflow step (e.g., by mouse click, etc.) to be performed for action workflow step 704. The workflow step can be a trigger step, an action step, or a condition step. After selecting the workflow step, the developer may configure the workflow step as described above. Furthermore, the developer may configure an action for workflow step 706, may add further workflow steps, etc., eventually being enabled to save the workflow.

It is noted that in some embodiments, a workflow step, such as first workflow step 502, may require credentials (e.g., a login and password) to access indicated data (e.g., to access a file at the location indicated in the text input box in FIG. 6). As such, the developer may be requested to provide credential information in association with first workflow step 502 so that when first workflow step 502 is performed during runtime, the data may be accessed. Alternatively, the credentials may be requested of a user during runtime.

B. Example Runtime Embodiments

According to embodiments, end users may execute workflows developed as described herein. During operation, an end user may interact with a GUI of the workflow, which may lead to workflow logic being executed. The workflow logic may execute locally (e.g., in a browser) and/or at a remote service (in "the cloud"). The workflow logic may access data of one or more local or network-accessible applications as was configured by the developer. Accordingly, the workflow performs its intended functions.

Figure 9:
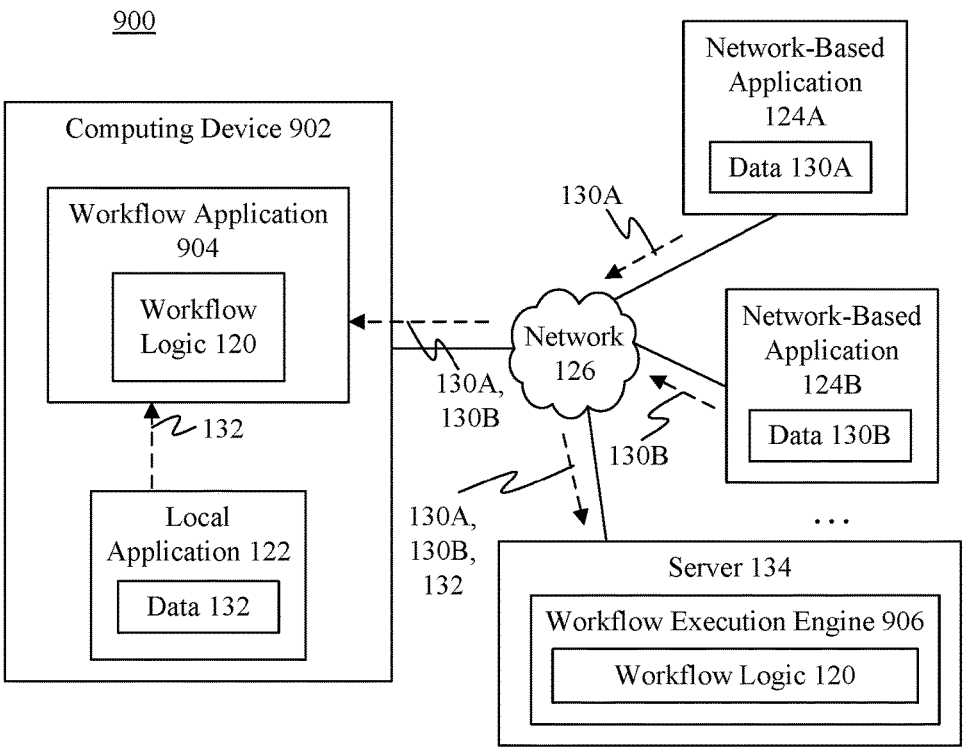
FIG. 9 is a block diagram of a system for executing a workflow, according to an example embodiment.

FIG. 9 is a block diagram of a system 900 for executing a workflow that includes one or more workflow steps, according to an example embodiment. As shown in FIG. 9, system 900 includes a computing device 902, first network-based application 124A, second network-based application 124B, and server 134. Computing device 902 includes a workflow application 904. Server 134 includes a workflow execution engine 906. System 900 is described as follows.

First and second network-based applications 124A and 124B are each optionally present, and whether or not such applications are communicated with will depend on the configuration of workflow logic 120. Further network-based applications may be present and communicated with, depending on the configuration of workflow logic 120.

Computing device 902 may be any type of stationary or mobile computing device described herein or otherwise known. Computing device 902 is configured to communicate with first and second network-based applications 124A and 124B and server 134 over network 126.

In one embodiment, workflows are executed at server 134 by workflow execution engine 906, and workflow application 904 is a UI application that enables a user at computing device 902 to interact with the executing workflows, such as by selecting and invoking the workflows, receiving communications from the executing workflows (e.g., messages, alerts, output data, etc.), providing requested input data to executing workflows, etc. In such an embodiment, workflow application 904 may be a workflow UI application associated with workflow execution engine 906 (e.g., workflow application 904 may be an extension of workflow execution engine 906) that may operate separate from or within a browser at computing device 902, or may be configured in another way. As shown in FIG. 9, workflow execution engine 906 may load workflow logic 120 for a selected workflow (e.g., selected from a workflow library by a user), and may execute workflow logic 120 to execute the workflow.

In another embodiment, workflow application 904 may be configured to execute workflows at computing device 902. For instance, an end user of computing device 902 may interact with a user interface of workflow application 904 to select and invoke a particular workflow (e.g., selected from a workflow library). In such embodiments, workflow logic 120 may operate separate from or in a browser at computing device 902, or may be configured in another way. As shown in FIG. 9, workflow application 904 may load workflow logic 120 for a selected workflow (e.g., selected from a workflow library by a user), and may execute workflow logic 120 to execute the workflow.

In another embodiment, a first portion of workflow logic 120 may execute in workflow application 904 at computing device 902 and a second portion of workflow logic 120 may execute in workflow execution engine 906 at server 134 and/or elsewhere.

Figure 10:
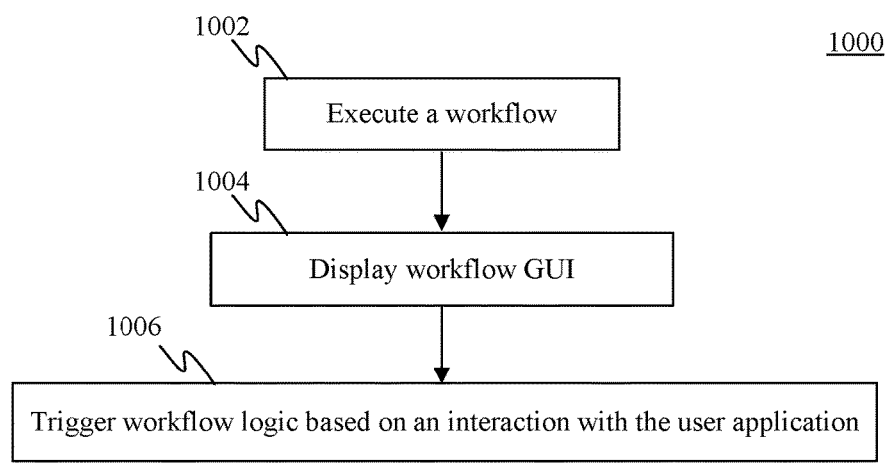
FIG. 10 depicts a flowchart of a process for executing a user application that includes one or more workflows, according to an example embodiment.

FIG. 10 depicts a flowchart 1000 of a process for executing workflow logic 120 of a workflow, according to an example embodiment. Flowchart 1000 is described as follows with respect to system 900 of FIG. 9 for illustrative purposes.

Flowchart 1000 begins with step 1002. In step 1002, the workflow is executed. In an embodiment, an end user at computing device 902 may cause workflow logic 120 to be executed, such as by command line, by clicking/tapping or otherwise interacting with an icon or other representation of the application, by selection in a browser, or in another manner. As described above, workflow logic 120 may execute in workflow application 904 at computing device 902 and/or in workflow execution engine 906 at server 134. When executed, the workflow steps of workflow logic 120 are performed in the configured sequence. Accordingly, one or more of the workflow steps may make calls to corresponding applications/services to perform their functions, such as local application 122 (to return data 132), network-based application 124A (to return data 130A), network-based application 124B (to return data 130B), and/or other local or network-based applications.

In step 1004, the workflow GUI is displayed. Step 1004 is optional, as in some embodiments, a GUI is not displayed for a workflow. In an embodiment, the GUI may be displayed by workflow application 904 at computing device 902. When displayed, the user may interact with the GUI by reviewing displayed data (e.g., from a file, database record, spreadsheet, or other data structure read by the workflow), by entering data into the GUI (e.g., by typing, by voice, etc.), and/or by interacting with one or more controls displayed by the GUI.

In step 1006, workflow logic is triggered based on an interaction with the workflow. Step 1006 is optional in cases where one or more workflow steps of a workflow require input from a user. In such cases, the user interacts with a control in a GUI of workflow application 904 associated with a workflow step of workflow logic 120 to provide information that triggers logic of the workflow step to operate.

In this manner, workflow logic 120 performs its functions, such as processing orders, tracking information, generating messages, processing documents to generate tasks or information, collecting feedback, and/or any other functions.

C. Example Embodiments in which a Workflow Designer User Interface of a Workflow Development Applications is Embedded in the User Interface of Another Software Application The workflow development application (i.e., workflow designer 106) described in the preceding section may be used by a developer to generate an automated workflow that includes an application programming interface (API) call to a service associated with a different software application. For example, the workflow development application may allow a developer to generate an automated workflow that includes one or more API calls to one or more services offered by Microsoft® Sharepoint®. However, this example is not intended to be limiting, and the automated workflow may include API calls to other services associated with other software applications.

In an embodiment, to facilitate access and ease of use, various features of workflow designer 106 may be embedded in or otherwise rendered accessible via a different software application entirely. For example, various features of workflow designer 106 may be embedded in or otherwise rendered accessible via Microsoft® Sharepoint®. As will be discussed below, this enables a user of Microsoft® Sharepoint® to more easily create automated workflows that invoke services or features of Microsoft® Sharepoint®. Again, such embodiments are not limited to Microsoft® Sharepoint®, and persons skilled in the relevant art(s) will readily appreciate that the features of workflow designer 106 may be embedded in other software applications, such as other software applications that offer services/features that can be invoked by an automated workflow. Moreover, the workflow steps and/or workflow templates that are selectable and/or displayed to the user may be customized based on information indicative of a context of a user within the software application from which workflow designer 106 was invoked.

Figure 11:
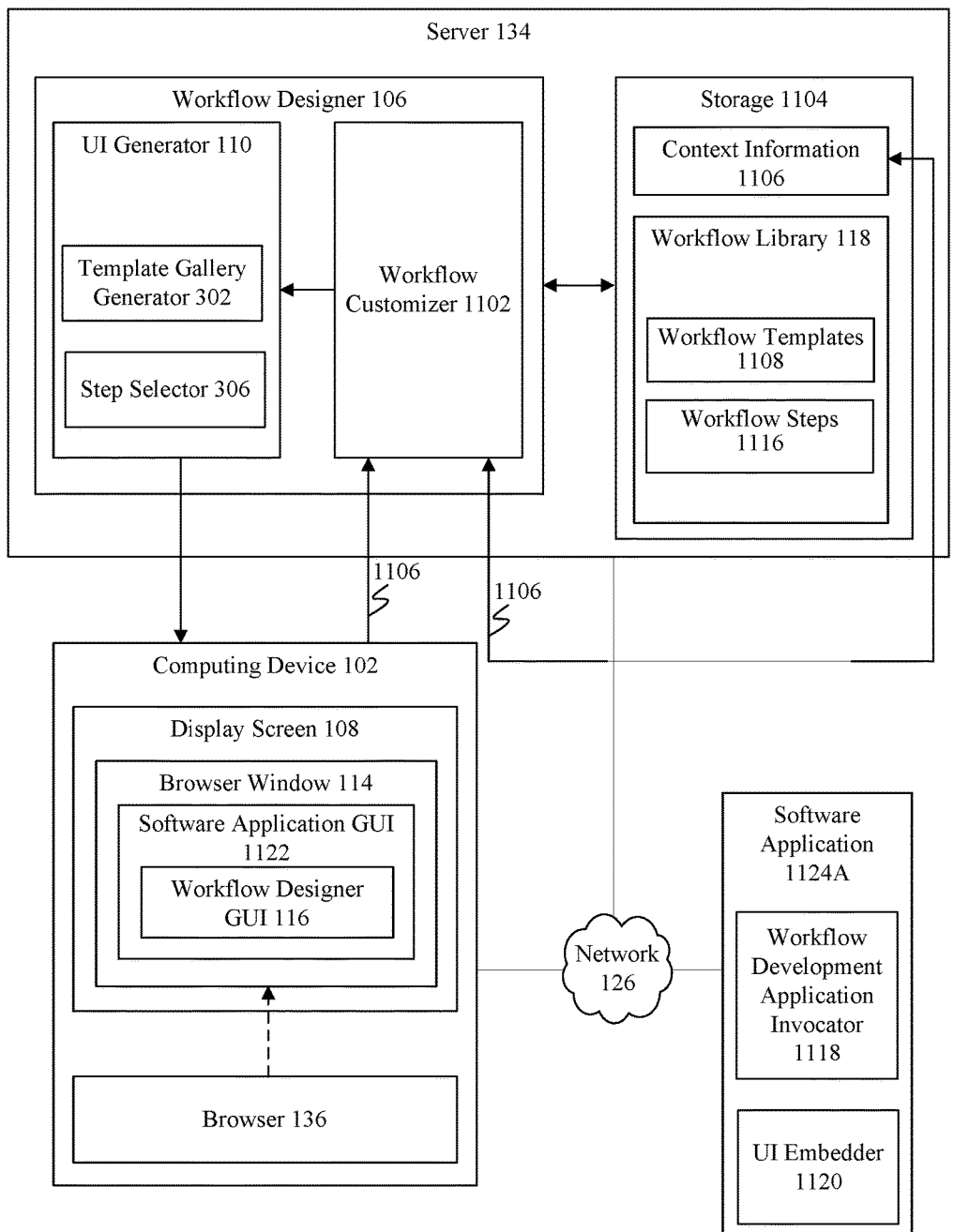
FIG. 11 is a block diagram of a workflow development system that is configured to embed a workflow designer user interface of a workflow development application into a user interface of another software application and customize workflow templates and workflow steps, according to an example embodiment.

FIG. 11 is a block diagram of a workflow development system 1100 that is configured to embed a user interface (e.g., workflow designer GUI 116) of a workflow development application (e.g., workflow designer 106) into a user interface of a software application 124A and customize workflow steps and/or workflow templates in accordance with an embodiment.

Workflow development system 1100 is an example implementation of workflow development system 100 as described above in reference to FIG. 1. Accordingly, workflow development system 1100 includes a server 134, a computing device 102 and software application 1124A. Software application 1124A is an example of network-based application 124A, as shown in FIG. 1. As shown in FIG. 11, software application 1124A includes a workflow development application invocator 1118 and a user interface embedder 1120.

Workflow development system 1100 includes workflow designer 106 that comprises UI generator 110, which in turn comprises template gallery generator 302 and step selector 306. As was previously described, template gallery generator 302 may generate a template gallery that is displayed to a developer via workflow designer GUI 116. The template gallery may include a plurality of selectable workflow templates, each of which includes one or more pre-selected workflow steps that are suitable for further configuration by the developer. In the embodiment shown in FIG. 11, the workflow templates that are displayed to the developer are selected from among a set of workflow templates 1108 that is stored in workflow library 118. The developer may select one of the displayed workflow templates for inclusion in her workflow, and may proceed with configuring the contents of the workflow template, and/or may add additional workflow steps to the workflow steps of the workflow template to generate a more complex workflow.

As was previously described, step selector 306 may enable the developer to select workflow steps for inclusion in the workflow, and to order the steps. The workflow steps presented to the user by by step selector 306 may be selected from among a set of workflow steps 1116 that are stored in workflow library 118. For instance, step selector 306 may display a menu of workflow steps, a scrollable and/or searchable list of available workflow steps, or may provide the workflow steps in another manner, and may enable the developer to select any number of workflow steps from the list for inclusion in the workflow.

In workflow development system 1100, workflow designer 106 also includes workflow customizer 1102. Workflow customizer 1102 is configured to obtain information indicative of a context of a user within software application 124A being used by the user and, based upon such obtained information, selectively identify a set of recommended workflow templates from among workflow templates 1108 and/or recommended workflow steps from among workflow steps 1116. Template gallery generator 302 can cause the set of recommended workflow templates and/or step selector 306 can cause the set of recommended workflow steps to be presented to the user via workflow designer GUI 116 that is embedded within a user interface of software application 1124A (e.g., software application GUI 1122). For example, by analyzing the information, workflow customizer 1102 can select workflow templates and/or workflow steps for presentation to the user that are more likely to be useful and/or of interest to the user.

UI generator 110 is configured to provide the recommended workflow templates and/or steps to computing device 102. As described above, a developer may interact with browser 136 executing on computing device 102 to access a network-based application. In particular, the developer may use browser 136 to traverse a network address (e.g., a uniform resource locator (URL)) to software application 124A, which invokes software application GUI 1122 (e.g., a web page) in browser window 114. Alternatively, software application 124A may be run locally with respect to computing device 102 as a local application (e.g., local application 122, as shown in FIG. 1). A user may be enabled to invoke workflow designer 106 using software application GUI 1122, which causes workflow designer GUI 116 to be embedded within software application GUI 1122.

Workflow customizer 1102 may also be configured to pre-populate (e.g., automatically populate) or select certain parameters of one or more workflow steps and/or a selected workflow template based on the information indicative of a context of a user within software application 124A (e.g., Microsoft® Sharepoint® or any other application) from which workflow designer 106 was invoked. This feature makes it very easy for the user to customize a selected template and/or workflow step.

In accordance with an embodiment, the parameters of a particular workflow template and/or workflow step that are configured to be pre-populated may be defined by a developer of the workflow template. For example, the developer may edit a definition file associated with the workflow template and/or workflow step (e.g., interface definition information 318, as described above with reference to FIG. 3) and specify which parameters are to be pre-populated by workflow generator 1102. For instance, for each parameter that is to be pre-populated, the developer may associate metadata that causes workflow customizer 1102 to pre-populate that parameter (assuming one or more values for that parameter are determinable based on the information indicative of the context of the user within software application 124A from which workflow designer 106 was invoked).

Figure 12:
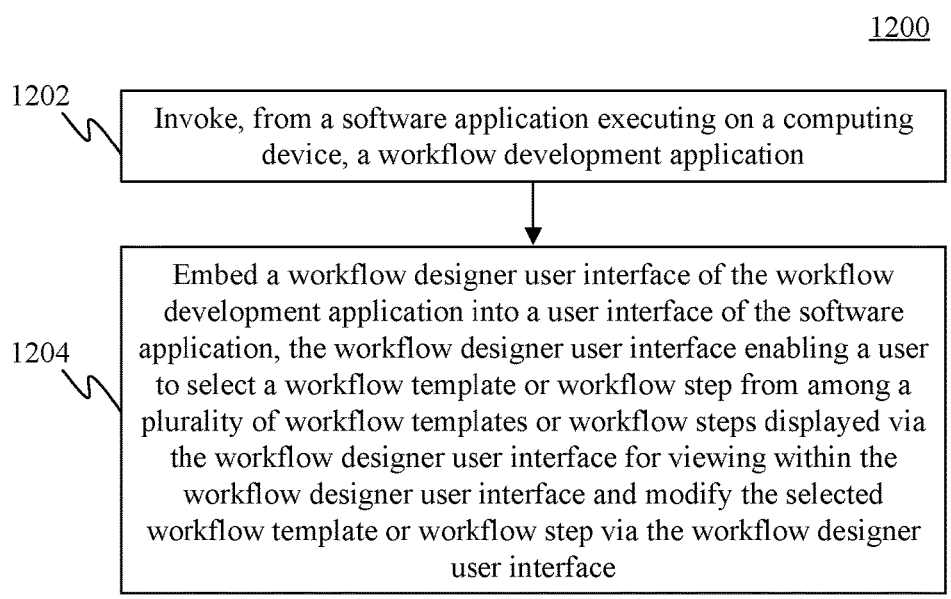
FIG. 12 depicts a flowchart of a method for embedding a workflow designer user interface of a workflow development application into a user interface of another software application in accordance with an embodiment, according to an example embodiment.

The manner in which workflow development system 1100 operates to embed a workflow designer user interface of a workflow development application into a user interface of a different software application will now be described in reference to FIG. 12. In particular, FIG. 12 depicts a flowchart 1200 of a method for embedding a workflow designer user interface of a workflow development application into a user interface of a different software application in accordance with an embodiment. For the sake of illustration, the method of flowchart 1200 will be described with continued reference to the components of exemplary workflow development system 1100. However, the method is not limited to that embodiment and may be performed using other components or systems entirely.

As shown in FIG. 12, the method of flowchart 1200 begins at step 1202, in which a workflow development application is invoked from a software application executing on a computing device. For example, with reference to FIG. 11, workflow development application invocator 1118 may invoke workflow designer 106.

By way of example, FIG. 13 shows an example view of software application GUI 1122 in accordance with an embodiment. As shown in FIG. 13, the user has utilized Microsoft® Sharepoint® to navigate to a screen (located at URL https://contoso.sharepoint.com/teams/marketing) that displays a list 1302 labeled "ASSETS." In addition to the list, this screen also includes an interactive element 1304 labeled "Add Flow".

In accordance with one or more embodiments, workflow development application invocator 1118 is configured to receive user input that causes an API call to be sent to the workflow development application that causes the workflow development application to be invoked. For example, with reference to FIG. 13, interactive element 1304 is configured to, when activated by a user (e.g., by touching it on a touchscreen, pointing to it with a mouse and clicking, etc.), to invoke workflow designer 106. For example, workflow development application invocator 1118 may send an API call to workflow designer 106 that causes workflow designer 106 to be invoked.

Returning now to the description of flowchart 1200, control flows to step 1204. During step 1204, a workflow designer user interface of the workflow development application is embedded into a user interface of the software application.

The workflow designer user interface enables a user to select a workflow template or workflow step from among a plurality of workflow templates or workflow steps displayed via the workflow designer user interface for viewing within the workflow designer user interface and modify the selected workflow template or workflow step via the workflow designer user interface. For example, with reference to FIG. 11, user interface embedder 1120 may be configured to embed workflow designer GUI 116 into software application GUI 1122.

FIG. 14 shows an example view of software application GUI 1122 in which workflow designer GUI 116 has been embedded responsive to the user activating interactive element 1304 in accordance with an embodiment. As shown in FIG. 14, workflow designer GUI 116 provides a list of user-selectable workflow templates 1402, 1404, 1406 and 1408 in a sidebar labeled "Create a new flow" within software application GUI 1122. It is noted that UI embedder 1120 may be configured to embed workflow designer GUI 116 in many ways. For example, UI embedder 1120 may be configured to embed workflow designer GUI 116 into software application GUI 1122 as a sidebar (as shown in FIG. 14). In another example, UI embedder 1120 may embed workflow designer GUI 116 by displaying workflow designer GUI 116 and software application GUI 1122 using a split screen configuration. In yet another example, UI embedder 1120 may embed workflow designer GUI 116 by overlaying workflow designer GUI 116 over at least a portion of software application GUI 1122. It is noted that in certain embodiments workflow designer GUI 116 may display one or more workflow steps in addition to or in lieu of the list workflow templates 1402, 1404, 1406, and 1408 responsive to the user activating interactive element 1304.

In accordance with one or more embodiments, the plurality of workflow templates or workflow steps displayed via workflow designer GUI 116 are selected based on the software application from which the workflow development application was invoked. For example, as shown in FIG. 14, each of workflow templates 1402, 1404, 1406 and 1408 that are displayed are related to Microsoft® Sharepoint®, which is the software application from which workflow designer 106 was invoked.

As shown in FIG. 14, each of the templates shown are based on the software application from which workflow designer GUI 116 was invoked (i.e., Microsoft® Sharepoint®). That is, each of workflow templates 1402, 1404, 1406 and 1408 include one or more workflow steps that involve an interaction with Microsoft® Sharepoint®. For example, workflow template 1402 automatically sends an e-mail when a new item is added in Microsoft® Sharepoint®. As another example, workflow template 1404 creates an object in Microsoft® Sharepoint® when an object is created in Salesforce®.

In accordance with one or more embodiments, the selected workflow template or workflow step is customized based on the software application from which the workflow development application was invoked. Additional details regarding the customization of selected workflow templates is described below in reference to flowchart 1600 of FIG. 16.

In accordance with one or more embodiments, the workflow development application is executed remotely with respect to the software application. For example, referring again to FIG. 11, workflow designer 106 may be executed on server 134, and software application 124A may be executed on an entity other than server 134. For instance, software application 124A may be executed on a different server than server 134 or in a distributed server environment that does not include server 134.

In accordance with one or more embodiments, the workflow development application is further configured to receive at least one of one or more input parameters and one or more output parameters associated with the customized workflow template or the customized workflow step. For example, referring again to FIG. 11, workflow designer 106 may be configured to receive at least one of one or more input parameters and one or more output parameters associated with the customized workflow template or the customized workflow step.

In accordance with one or more embodiments, the workflow designer user interface enables the user to modify the selected workflow template or workflow step by enabling the user to enter one or more user-customizable parameters associated with the workflow template.

Figure 15:
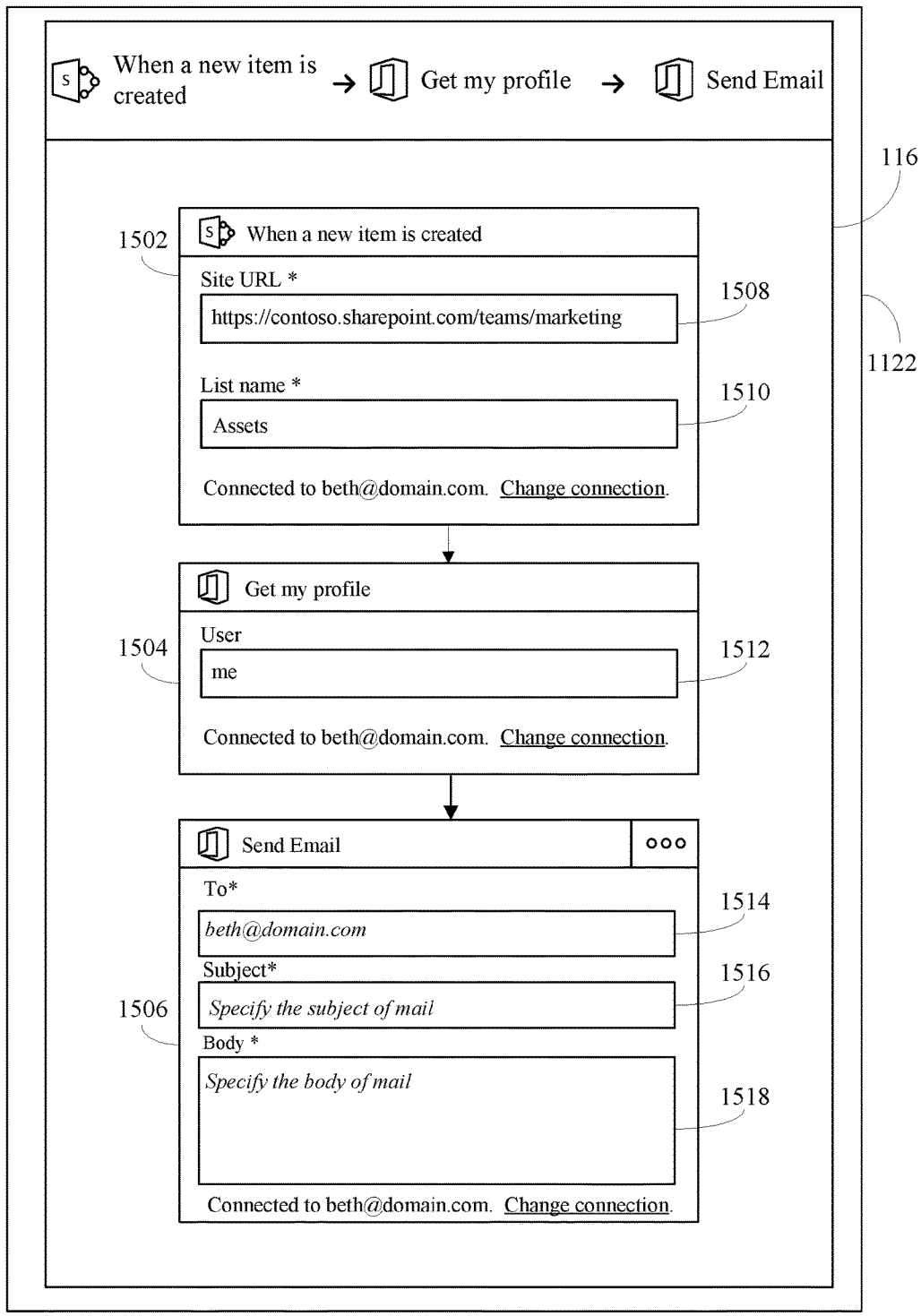
FIG. 15 shows an example view of a software application GUI in which a workflow designer GUI has been embedded, according to an example embodiment.

By way of example, FIG. 15 shows an example view of software application GUI 1122 in which workflow designer GUI 116 has been embedded responsive to a user selecting (e.g., activating) workflow template 1402 in accordance with an embodiment. As shown in FIG. 15, workflow designer GUI 116 is overlaid on top of software application GUI 1122, although this is only one example of how workflow designer GUI 116 may be embedded within software application GUI 1122. Workflow designer GUI 116 provides a graphical representation of the steps that make up workflow template 1402. The steps include a first workflow step 1502, entitled "When a new item is created," a second workflow step 1504, entitled "Get my profile," and a third workflow step 1506, entitled "Send Email".

Each of first workflow step 1502, second workflow step 1504 and third workflow step 1506 may be configured to receive one or more user-customizable parameters that may manually customized by the user. First workflow step 1502 may be thought of as a trigger step, since it is activated at runtime by the occurrence of a triggering event. In this case, first workflow step 1502 is activated whenever a new item is created in a particular Microsoft® Sharepoint® list on a particular a Microsoft® Sharepoint® site. First workflow step 1502 includes a data entry box 1508 and a data entry box 1510 that are both configured to receive user-customizable parameters. Data entry box 1508 is configured to receive a user-customizable parameter that identifies a Sharepoint® site URL, and data entry box 1510 is configured to receive a user-customizable parameter that identifies a list name located at that site URL. Workflow designer GUI 116 may be configured to receive input from a user that causes the user-customizable parameters to be populated with user-specified information.

Second workflow step 1504 and third workflow step 1506 may be thought of as action steps, since they cause an action to be performed at runtime in response to the execution of the trigger step. In this case, the action in second workflow step 1504 is obtaining profile information associated with the user, and the action in third workflow step 1506 is sending an email. As shown in FIG. 15, second workflow step 1504 includes a data entry box 1512 that is configured to receive a user-customizable parameter that identifies a user profile of the user of software application 124A.

With respect to third workflow step 1506, the user is enabled to add a user-customizable parameter (e.g., the email address of any intended recipient of the email) to a data entry box 1514, a user-customizable parameter (e.g., the subject of the email) into data entry box 1516, and a user-user customizable parameter (e.g., the body of the email) into data entry box 1518.

Figure 16:
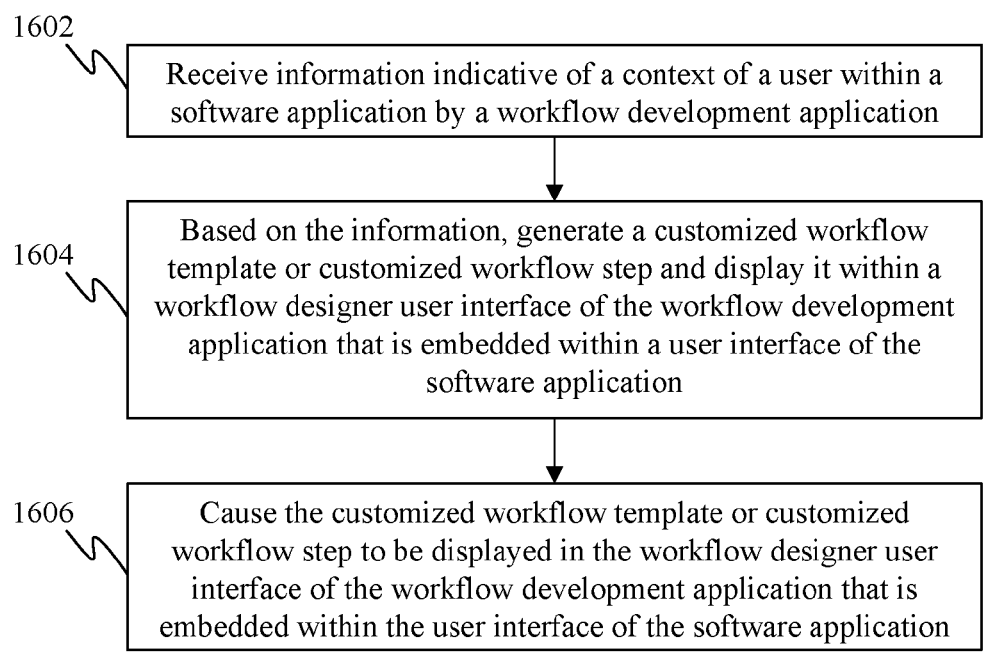
FIG. 16 depicts a flowchart of a method by which a workflow development application provides a user with a customized workflow template and/or workflow step(s) via a workflow designer user interface of the workflow development application that is embedded within another software application, according to an example embodiment.

The manner in which workflow development system 1100 operates to provide customized workflow templates and/or workflow steps will now be described in reference to FIG. 16. In particular, FIG. 16 depicts a flowchart 1600 of a method by which a workflow development application provides a user with a customized workflow template and/or workflow step(s) via a workflow designer user interface that is embedded within a different software application in accordance with an embodiment. For the sake of illustration, the method of flowchart 1600 will be described with continued reference to the components of exemplary workflow development system 1100. However, the method is not limited to that embodiment and may be performed using other components or systems entirely.

As shown in FIG. 16, the method of flowchart 1600 begins at step 1602, in which information indicative of a context of a user within a software application is received by a workflow development application. For example, workflow customizer 1102 of workflow designer 106 may receive information indicative of a context of a user within software application 124A.

In accordance with an embodiment, the workflow development application is executed remotely with respect to the software application. For example, with continued reference to FIG. 11, workflow designer 106 may be executed on server 134, and software application 124A may be executed on an entity other than server 134. For instance, software application 124A may be executed on a server that is different than server 134 or in a distributed server environment that does not include server 134.

In FIG. 11, the information indicative of a context of a user within software application 124A is denoted context information 1106. Such context information 1106 may be stored in storage 1104 along with workflow library 118 and accessed therefrom by workflow customizer 1102. Storage 1104 may comprise one or more devices and/or systems that are suitable for storing data and that are accessible to workflow designer 106 and workflow customizer 1102. In FIG. 11, storage 1104 comprises part of server 134. However, in alternate embodiments storage 1104 may be separate from server 134 but connected thereto for the purposes of providing remote data storage capabilities. Depending upon the implementation, storage 1104 may comprise a cloud-based storage service, a storage device such as a network attached storage device, a disk array, a tape library, an optical or magnetic disk drive, or the like, or a storage area network. However, these are only examples and are not intended to be limiting.

Context information 1106 may be obtained by automatically monitoring a user's actions when interacting with software application 124A. For example, software application 124A, workflow customizer 1102, or some other logic within workflow designer 106 may be configured to collect various information while the user is interacting with software application 124A. Such context information may include one or more features of software application 124A that are being used by the user of software application 124A, certain information of software application 124A currently being viewed and/or being interacted with the user, historical information concerning one or more actions previously performed by the user with respect to software application 124A, and/or connectors used by the user in association with software application 124A. As used herein, the term "connector" generally refers to an application or service that may be invoked or interacted with by software application 124A. Context information 1106 may also include one or more identifiers of software application 124A (e.g., the name, version, build number, or any other information suitable for identifying software application 124A).

Such context information may be used by workflow customizer 1102 to recommend workflow templates and/or workflow step(s) and/or pre-populate certain user-customizable parameters of workflow step(s) of a selected workflow template and/or standalone workflow step(s) (i.e., workflow step(s) not included as part of a workflow template). For example, context information 1106 may be used to recommend workflow template(s) and/or workflow step(s) and/or pre-populate certain user-customizable parameters of a selected template and/or workflow step based on the software application used to invoke workflow designer 106 (e.g., software application 124A), the feature(s) of the software application used (or currently in use) by the user, the information being viewed and/or being interacted by the user and/or the connector(s) used by the user in association with the software application.

In accordance with an embodiment, software application 124A sends an API call to workflow designer 106 that includes context information 1106.

It is noted that the above-described examples of information that may be included in context information 1106 are just a few examples. Persons skilled in the relevant art(s) will appreciated that other types of user information not mentioned here may be included as well.

Returning again to the description of flowchart 1600, after the information indicative of a context of a user within the software application has been received at step 1602, control flows to step 1604. During step 1604, based on the information, a customized workflow template or customized workflow step is generated and displayed within a workflow designer user interface of the workflow development application that is embedded within a user interface of the software application. For example, with reference to FIG. 16, workflow customizer 1102 may generate a customized workflow template or customized workflow step and display it within workflow designer GUI 116 that is embedded within software application GUI 1122 based on context information 1106. The generated customized workflow template and/or workflow step may be based on a workflow template that is selected from the plurality of workflow templates provided by template gallery generator 302 and/or a workflow step that is selected from a plurality of workflow steps provided by step selector 306.

For example, with continued reference to FIG. 14, each of workflow templates 1402, 1404, 1406 and 1408 may be an interactive element that a user can activate. Upon activating one of workflow templates 1402, 1404, 1406 or 1408, workflow customizer 1102 may generate a customized version of the selected workflow template based on context information 1106.

Continuing with the description of flowchart 1600, at step 1606, the customized workflow template or customized workflow step is caused to be displayed in the workflow designer user interface of the workflow development application embedded within the user interface of the software application. For example, with reference to FIG. 11, UI generator 110 causes the customized workflow template or customized workflow step to be displayed in workflow designer GUI 116 embedded within software application GUI 1122.

In accordance with one or more embodiments, a user interaction with the software application causes the workflow designer user interface of the workflow development application to be embedded with the user interface of the software application. For example, with reference to FIG. 11, a user interaction with software application 124A causes workflow designer GUI 116 to be embedded with software application GUI 1122. For instance, with reference to FIG. 13, interactive element 1304 is configured to, when activated by a user to invoke workflow designer 106, and subsequently cause UI embedder 1120 to embed workflow designer GUI 116 in software application GUI 1122.

Referring again to FIG. 15, each of first workflow step 1502, second workflow step 1504 and third workflow step 1506 may be configured to receive one or more user-customizable parameters automatically by workflow customizer 1102. For example, workflow customizer 1102 may pre-populate the user-customizable parameters based on context information 1106. For example, since this workflow template was selected while the user was viewing the list "Assets" on a Microsoft® Sharepoint® site having the URL "https://contoso.sharepoint.com/teams/marketing," (as shown in FIG. 14), data entry boxes 1508 and 1510 may be automatically pre-populated based on this context information. That is, workflow customizer 1102 may be configured to automatically populate or select certain parameters of a step based on the context the user was in within Microsoft® Sharepoint® (or any other application) when workflow designer 106 was launched. This feature makes it very easy for the user to customize a selected template.

As further shown in FIG. 15, data entry box 1512 has been pre-populated by workflow customizer 1102 based on context information 1106. In particular, context information 1106 includes an identifier of the user of software application 124A, and workflow customizer 1102 uses this identifier to pre-populate data entry box 1512 with user-customizable parameter "me".

With respect to third workflow step 1506, data entry box 1514 has been pre-populated by workflow customizer 1102 based on context information 1106. In particular, context information 1106 includes an email address ("beth@domain.com") associated with the user of software application 124A, and workflow customizer 1102 uses this email address to pre-populate data entry box 1514 with user-customizable parameter "beth@domain.com".

In accordance with one or more embodiments, each of first workflow step 1502, second workflow step 1504 and third workflow step 1506 may further be configured to receive input from a user via workflow designer GUI 116 that causes at least one of the above-described user-customizable parameters to be populated as described earlier with reference to FIGS. 12 and 15.

In accordance with one or more embodiments, the customized workflow template or the customized workflow step is configured to invoke a software application that is different than the software application for which the context is received.

Thus, the method of flowchart 1600 enables a workflow development system to present a user thereof with customized workflow template(s) and/or workflow step(s) of a workflow development application that is embedded within a different software application. The customized workflow template(s) and/or workflow step(s) are likely to be useful and/or of interest to the user in developing fully-customized workflows in a simple and efficient manner. Such customized workflow template(s) and/or workflow step(s) provide a technical effect in that they can improve the user experience when using the workflow development system because the user is enabled to more quickly locate desired workflow templates and/or workflow steps and create workflows than she otherwise would be. This feature can also provide a technical effect in that the performance of the underlying computers upon which the workflow development system is implemented is improved; in particular, the user is enabled to develop a desired workflow more quickly, thereby conserving computing resources such as power, processor cycles, network bandwidth, and the like.

It is noted that while the foregoing embodiments describe the software application from which the workflow development application is invoked as being a different software application than and/or external to the workflow development application, in accordance with one or more embodiments, the workflow development application may be part of and/or incorporated into the software application. In accordance with such embodiments, upon invoking the workflow development application, the user interface of the workflow development application is presented within (rather than embedded into) the user interface of the software application.

III. Example Mobile Device Implementation

Figure 17:
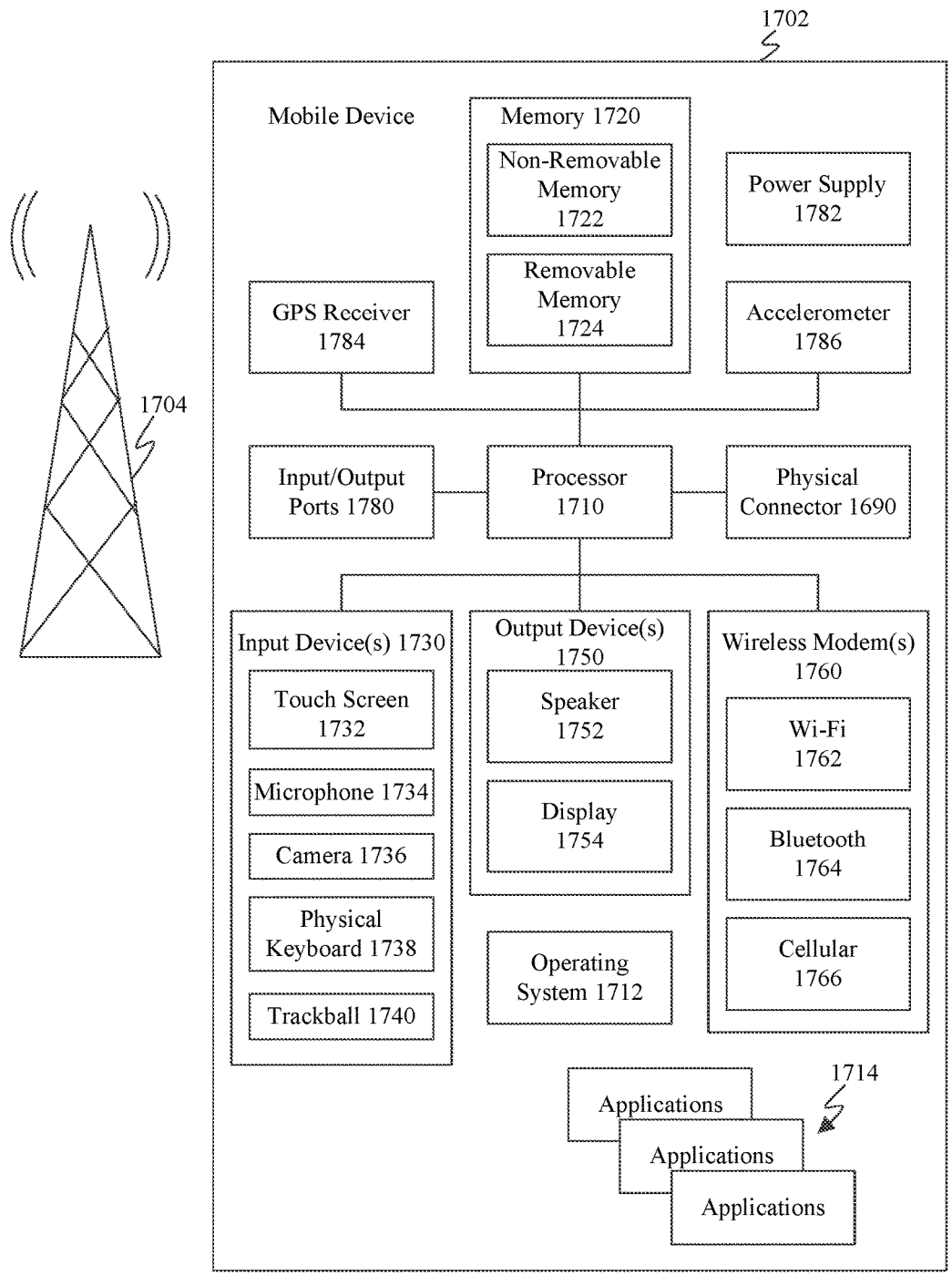
FIG. 17 is a block diagram of an example mobile device that may be used to implement various embodiments.

FIG. 17 is a block diagram of an exemplary mobile device 1702 that may implement embodiments described herein. For example, mobile device 1702 may be used to implement computing device 102 of FIGS. 1 and 11 or computing device 902 of FIG. 9. As shown in FIG. 17, mobile device 1702 includes a variety of optional hardware and software components. Any component in mobile device 1702 can communicate with any other component, although not all connections are shown for ease of illustration. Mobile device 1702 can be any of a variety of computing devices (e.g., cell phone, smart phone, handheld computer, Personal Digital Assistant (PDA), etc.) and can allow wireless two-way communications with one or more mobile communications networks 1704, such as a cellular or satellite network, or with a local area or wide area network.

Mobile device 1702 can include a controller or processor 1710 (e.g., signal processor, microprocessor, ASIC, or other control and processing logic circuitry) for performing such tasks as signal coding, data processing, input/output processing, power control, and/or other functions. An operating system 1712 can control the allocation and usage of the components of mobile device 1702 and provide support for one or more application programs 1714 (also referred to as "applications" or "apps"). Application programs 1714 may include common mobile computing applications (e.g., e-mail applications, calendars, contact managers, web browsers, messaging applications) and any other computing applications (e.g., word processing applications, mapping applications, media player applications).

Mobile device 1702 can include memory 1720. Memory 1720 can include non-removable memory 1722 and/or removable memory 1724. Non-removable memory 1722 can include RAM, ROM, flash memory, a hard disk, or other well-known memory devices or technologies. Removable memory 1724 can include flash memory or a Subscriber Identity Module (SIM) card, which is well known in GSM communication systems, or other well-known memory devices or technologies, such as "smart cards." Memory 1720 can be used for storing data and/or code for running operating system 1712 and application programs 1714. Example data can include web pages, text, images, sound files, video data, or other data to be sent to and/or received from one or more network servers or other devices via one or more wired or wireless networks. Memory 1720 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

Mobile device 1702 can support one or more input devices 1730, such as a touch screen 1732, a microphone 1734, a camera 1736, a physical keyboard 1738 and/or a trackball 1740 and one or more output devices 1750, such as a speaker 1752 and a display 1754. Other possible output devices (not shown) can include piezoelectric or other haptic output devices. Some devices can serve more than one input/output function. For example, touch screen 1732 and display 1754 can be combined in a single input/output device. Input devices 1730 can include a Natural User Interface (NUI).

Wireless modem(s) 1760 can be coupled to antenna(s) (not shown) and can support two-way communications between processor 1710 and external devices, as is well understood in the art. Modem(s) 1760 are shown generically and can include a cellular modem 1766 for communicating with the mobile communication network 1704 and/or other radio-based modems (e.g., Bluetooth 1764 and/or Wi-Fi 1662). At least one of wireless modem(s) 1760 is typically configured for communication with one or more cellular networks, such as a GSM network for data and voice communications within a single cellular network, between cellular networks, or between the mobile device and a public switched telephone network (PSTN).

Mobile device 1702 can further include at least one input/output port 1780, a power supply 1782, a satellite navigation system receiver 1784, such as a Global Positioning System (GPS) receiver, an accelerometer 1786, and/or a physical connector 1790, which can be a USB port, IEEE 1394 (FireWire) port, and/or RS-232 port. The illustrated components of mobile device 1702 are not required or all-inclusive, as any components can be deleted and other components can be added as would be recognized by one skilled in the art.

In an embodiment, mobile device 1702 is configured to implement any of the above-described features of workflow development system 100 of FIG. 1 or workflow development system 1100 of FIG. 11. Computer program logic for performing the functions of these devices may be stored in memory 1720 and executed by processor 1710.

IV. Example Computer System Implementation

Figure 18:
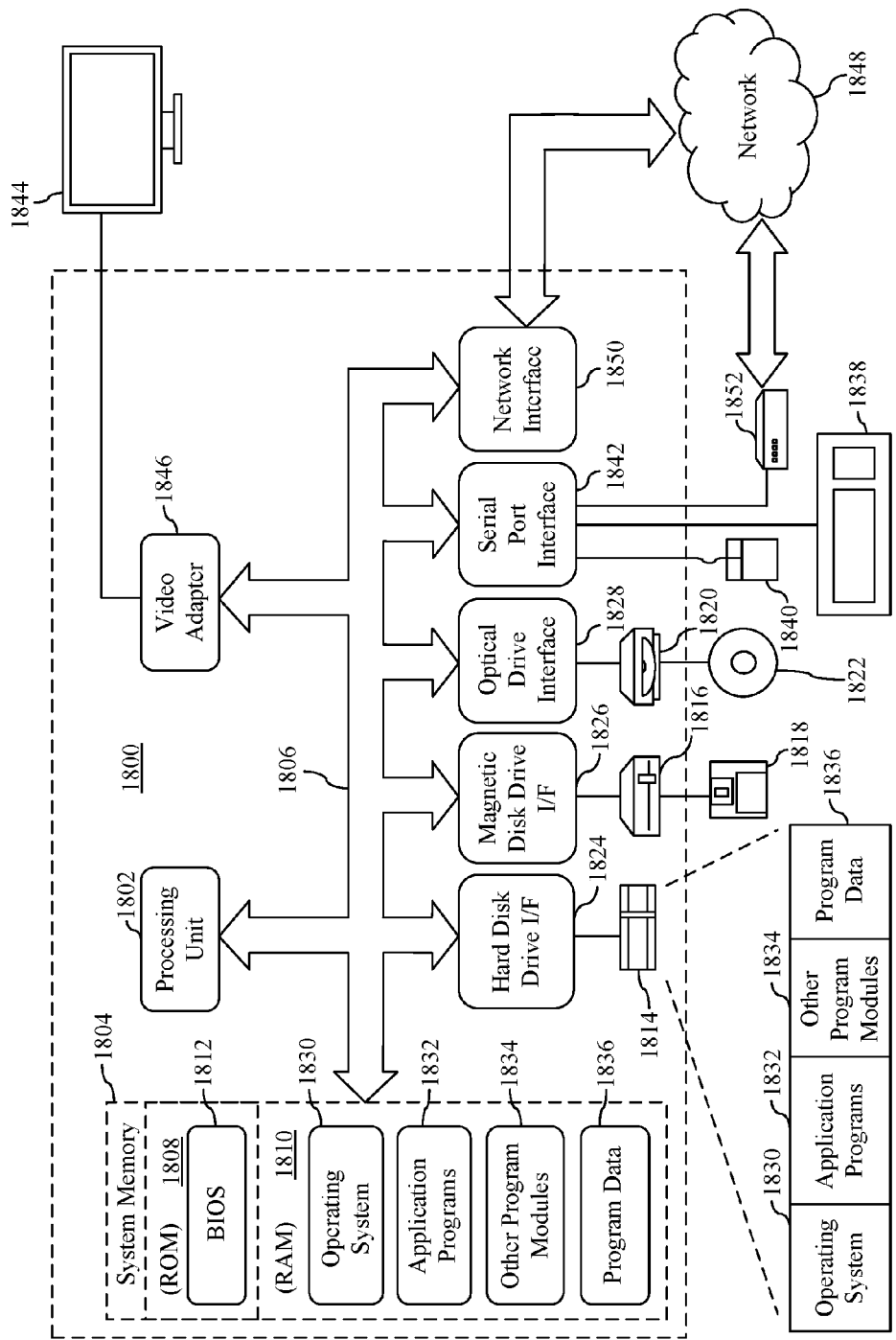
FIG. 18 is a block diagram of an example processor-based computer system that may be used to implement various embodiments.

FIG. 18 depicts an example processor-based computer system 1800 that may be used to implement various embodiments described herein. For example, system 1800 may be used to implement computing device 102 or server 134 as described above in reference to FIGS. 1 and 11, or computing device 902 as described above in reference to FIG. 9. System 1800 may also be used to implement any of the steps of any of the flowcharts of FIGS. 2, 10, 12 and 16, as described above. The description of system 1800 provided herein is provided for purposes of illustration, and is not intended to be limiting. Embodiments may be implemented in further types of computer systems, as would be known to persons skilled in the relevant art(s).

As shown in FIG. 18, system 1800 includes a processing unit 1802, a system memory 1804, and a bus 1806 that couples various system components including system memory 1804 to processing unit 1802. Processing unit 1802 may comprise one or more circuits, microprocessors or microprocessor cores. Bus 1806 represents one or more of any of several types of bus structures, including a memory bus or memory controller, a peripheral bus, an accelerated graphics port, and a processor or local bus using any of a variety of bus architectures. System memory 1804 includes read only memory (ROM) 1808 and random access memory (RAM) 1810. A basic input/output system 1812 (BIOS) is stored in ROM 1808.

System 1800 also has one or more of the following drives: a hard disk drive 1814 for reading from and writing to a hard disk, a magnetic disk drive 1816 for reading from or writing to a removable magnetic disk 1818, and an optical disk drive 1820 for reading from or writing to a removable optical disk 1822 such as a CD ROM, DVD ROM, BLU-RAY™ disk or other optical media. Hard disk drive 1814, magnetic disk drive 1816, and optical disk drive 1820 are connected to bus 1806 by a hard disk drive interface 1824, a magnetic disk drive interface 1826, and an optical drive interface 1828, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 1830, one or more application programs 1832, other program modules 1834, and program data 1836. In accordance with various embodiments, the program modules may include computer program logic that is executable by processing unit 1802 to perform any or all of the functions and features of computing device 102 or server 134 as described above in reference to FIGS. 1 and 11, or computing device 902 as described above in reference to FIG. 9. The program modules may also include computer program logic that, when executed by processing unit 1802, causes processing unit 1802 to perform any of the steps of any of the flowcharts of FIGS. 2, 10, 12 and 16, as described above.

A user may enter commands and information into system 1800 through input devices such as a keyboard 1838 and a pointing device 1840 (e.g., a mouse). Other input devices (not shown) may include a microphone, joystick, game controller, scanner, or the like. In one embodiment, a touch screen is provided in conjunction with a display 1844 to allow a user to provide user input via the application of a touch (as by a finger or stylus for example) to one or more points on the touch screen. These and other input devices are often connected to processing unit 1802 through a serial port interface 1842 that is coupled to bus 1806, but may be connected by other interfaces, such as a parallel port, game port, or a universal serial bus (USB). Such interfaces may be wired or wireless interfaces.

Display 1844 is connected to bus 1806 via an interface, such as a video adapter 1846. In addition to display 1844, system 1800 may include other peripheral output devices (not shown) such as speakers and printers.

System 1800 is connected to a network 1848 (e.g., a local area network or wide area network such as the Internet) through a network interface 1850, a modem 1852, or other suitable means for establishing communications over the network. Modem 1852, which may be internal or external, is connected to bus 1806 via serial port interface 1842.

As used herein, the terms "computer program medium," "computer-readable medium," and "computer-readable storage medium" are used to generally refer to memory devices or storage structures such as the hard disk associated with hard disk drive 1814, removable magnetic disk 1818, removable optical disk 1822, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1832 and other program modules 1834) may be stored on the hard disk, magnetic disk, optical disk, ROM, or RAM. Such computer programs may also be received via network interface 1850, serial port interface 1842, or any other interface type. Such computer programs, when executed or loaded by an application, enable system 1700 to implement features of embodiments discussed herein. Accordingly, such computer programs represent controllers of the system 1800. Embodiments are also directed to computer program products comprising software stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

In alternative implementations, system 1800 may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

V. Additional Example Embodiments

A system in a computing device is described herein. The system includes at least one processor circuit and at least one memory that stores program code configured to be executed by the at least one processor circuit. The program code comprises a workflow development application invocator configured to invoke, from a software application executing on the computing device, a workflow development application and a user interface embedder configured to embed a workflow designer user interface of the workflow development application into a user interface of the software application. The user interface enables a user to select a workflow template or workflow step from among a plurality of workflow templates or workflow steps displayed via the workflow designer user interface for viewing within the workflow designer user interface and modify the selected workflow template or workflow step via the user interface.

In one embodiment of the foregoing system, the workflow development application invocator is configured to receive user input that causes an application programming interface (API) call to be provided to the workflow development application that causes the workflow development application to be invoked.

In another embodiment of the foregoing system, the selected workflow template or workflow step is customized based on the software application from which the workflow development application was invoked.

In a further embodiment of the foregoing system, the plurality of workflow templates or workflow steps displayed via the GUI are selected based on the software application from which the workflow development application was invoked.

In yet another embodiment of the foregoing system, the workflow development application is executed remotely with respect to the software application.

In yet another further embodiment of the foregoing system, the workflow designer user interface enables the user to modify the selected workflow template or workflow step by enabling the user to enter one or more user-customizable parameters associated with the workflow template.

A method is also described herein. The method includes: receiving information indicative of a context of a user within a software application by a workflow development application; based on the information, generating a customized workflow template or customized workflow step within a workflow designer user interface of the workflow development application that is embedded within a user interface of the software application; and causing the customized workflow template or customized workflow step to be displayed in the workflow designer user interface of the workflow development application that is embedded within the user interface of the software application.

In one embodiment of the foregoing method, generating the customized workflow template or customized workflow step within the workflow designer user interface of the workflow development application that is embedded within a user interface of the software application comprises pre-populating at least one of one or more user-customizable parameters associated with the customized workflow template or customized workflow step based on the information.

In another embodiment of the foregoing method, the method further comprises receiving input from a user via the user interface that causes at least one of one or more user-customizable parameters associated with the customized workflow template to be populated.

In a further embodiment of the foregoing method, receiving information indicative of a context of a user within the software application by the workflow development application comprises receiving, by the workflow development application, an API call from the software application that includes the information.

In yet another embodiment of the foregoing method, the workflow development application is executed remotely from the software application.

In still another embodiment of the foregoing method, a user interaction with the software application causes the workflow designer user interface of the workflow development application to be embedded within the user interface of the software application.

In still yet another embodiment of the foregoing method, the context comprises one or more features of the software application currently being utilized by the user.

Another system is also described herein. The system includes at least one processor circuit and at least one memory that stores program code configured to be executed by the at least one processor circuit. The program code includes a workflow development application. The workflow development application is configured to receive information indicative of a context of a user within a software application, generate a customized workflow template or a customized workflow step based on the information, and cause the customized workflow template or workflow step to be presented within a workflow designer user interface that is embedded within a user interface of the software application.

In one embodiment of the foregoing system, the workflow development application is further configured to pre-populate at least one of one or more user-customizable parameters associated with the customized workflow template or the customized workflow step based on the information.

In another embodiment of the foregoing system, the workflow development application is further configured to receive input from a user via the workflow designer user interface that causes at least one of one or more user-customizable parameters associated with the customized workflow template or the customized workflow step to be populated.

In yet another embodiment of the foregoing system, the workflow development application is configured to receive an API call from the software application that includes the information.

In a further embodiment of the foregoing system, the workflow development application is executed remotely with respect to the software application.

In yet another further embodiment of the foregoing method, a user interaction with the software application causes the workflow designer user interface of the workflow development application to be embedded within the user interface of the software application.

In still another embodiment of the foregoing system, the context comprises one or more features of the software application currently being utilized by the user.

In yet another embodiment of the foregoing system, the workflow development application is further configured to receive at least one of one or more input parameters and one or more output parameters associated with the customized workflow template or the customized workflow step.

VI. Conclusion

While various embodiments have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system, comprising:
   at least one processor circuit; and
   at least one memory that stores program code configured to be executed by the at least one processor circuit, the program code comprising:
      a workflow development application configured to:
         receive user context information indicative of a context of a user within a software application, the software application being different from the workflow development application;
         customize a workflow template or a workflow step based on the user context information to generate a customized workflow template or a customized workflow step, respectively; and
         cause the customized workflow template or workflow step to be presented within a workflow designer graphical user interface of the workflow development application that is embedded within a user interface of the software application.

2. The system of claim 1, wherein the workflow development application is further configured to pre-populate at least one of one or more user-customizable parameters associated with the customized workflow template or the customized workflow step based on the user context information.

3. The system of claim 1, wherein the workflow development application is further configured to receive input from the user via the workflow designer graphical user interface that causes at least one of one or more user-customizable parameters associated with the customized workflow template or the customized workflow step to be populated.

4. The system of claim 1, wherein the workflow development application is configured to receive an API call from the software application that includes the user context information.

5. The system of claim 1, wherein the workflow development application is executed remotely with respect to the software application.

6. The system of claim 1, wherein a user interaction with the software application causes the workflow designer graphical user interface of the workflow development application to be embedded within the user interface of the software application.

7. The system of claim 1, wherein the context comprises one or more features of the software application currently being utilized by the user.

8. The system of claim 1, wherein the workflow development application is further configured to receive at least one of one or more input parameters and one or more output parameters associated with the customized workflow template or the customized workflow step.

9. A system, comprising:
   at least one processor circuit; and
   at least one memory that stores program code configured to be executed by the at least one processor circuit, the program code comprising:
      a workflow development application invocator configured to invoke, from a software application executing on a computing device, a workflow development application, the software application being different than the workflow development application; and
      a user interface embedder configured to embed a workflow designer graphical user interface of the workflow development application into a user interface of the software application, the workflow designer graphical user interface enabling a user to:
         select a workflow template or workflow step from among a plurality of workflow templates or workflow steps displayed via the workflow designer graphical user interface for viewing within the workflow designer graphical user interface, the selected workflow template being automatically customized by the workflow development application based on user context information that is indicative of a context of a user within the software application; and
         modify the selected workflow template or workflow step via the workflow designer graphical user interface.

10. The system of claim 9, wherein the workflow development application invocator is configured to receive user input that causes an application programming interface (API) call to be provided to the workflow development application that causes the workflow development application to be invoked.

11. The system of claim 9, wherein the selected workflow template or workflow step is customized based on the software application from which the workflow development application was invoked.

12. The system of claim 9, wherein the plurality of workflow templates or workflow steps displayed via the GUI are selected based on the software application from which the workflow development application was invoked.

13. The system of claim 9, wherein the workflow development application is executed remotely with respect to the software application.

14. A method, comprising:
   receiving user context information indicative of a context of a user within a first software application by a workflow development application, the first software application being different than the workflow development application;
   based on the user context information, customizing a workflow template or a workflow step to generate a customized workflow template or customized workflow step respectively, and presenting the customized workflow template or the customized workflow step within a workflow designer graphical user interface of the workflow development application that is presented within a user interface of the first software application, the customized workflow template or the customized workflow step being configured to invoke at least one second software application that is different than the first software application; and causing the customized workflow template or customized workflow step to be displayed in the workflow designer graphical user interface that is presented within the user interface of the first software application.

15. The method of claim 14, said generating comprising:
pre-populating at least one of one or more user-customizable parameters associated with the customized workflow template or customized workflow step based on the user context information.

16. The method of claim 14, further comprising:
receiving input from a user via the workflow designer graphical user interface that causes at least one of one or more user-customizable parameters to be populated.

17. The method of claim 14, said receiving comprising:
receiving, by the workflow development application, an API call from the first software application that includes the user context information.

18. The method of claim 14, wherein the workflow development application is executed remotely with respect to the first software application.

19. The method of claim 14, wherein a user interaction with the first software application causes the workflow designer graphical user interface of the workflow development application to be presented within the user interface of the first software application.

20. The method of claim 14, wherein the context comprises one or more features of the first software application currently being utilized by the user.

* * * * *